US012565873B2

(12) United States Patent
Orridge

(10) Patent No.: US 12,565,873 B2
(45) Date of Patent: Mar. 3, 2026

(54) SYSTEM AND METHODS FOR OCEANIC AND ATMOSPHERIC CARBON DIOXIDE AND CLIMATE MANAGEMENT, ALGAL FOSTERING, AND INITIATION AND MAINTENANCE OF FISHERIES BY DEEPER NUTRIENT RICH WATER PUMPING

(71) Applicant: St. Jean Orridge, Cavello Bay (BM)

(72) Inventor: St. Jean Orridge, Cavello Bay (BM)

(*) Notice: Subject to any disclaimer, the term of this patent is extended or adjusted under 35 U.S.C. 154(b) by 0 days.

(21) Appl. No.: 18/913,968

(22) Filed: Oct. 11, 2024

(65) Prior Publication Data

US 2025/0116251 A1      Apr. 10, 2025

Related U.S. Application Data

(63) Continuation-in-part of application No. 18/150,735, filed on Jan. 5, 2023, now abandoned.

(60) Provisional application No. 63/276,261, filed on Nov. 5, 2021.

(51) Int. Cl.
| | |
|---|---|
| *F03B 13/06* | (2006.01) |
| *A01K 61/60* | (2017.01) |
| *A01K 61/10* | (2017.01) |

(52) U.S. Cl.
CPC .............. *F03B 13/06* (2013.01); *A01K 61/60* (2017.01); *A01K 61/10* (2017.01)

(58) Field of Classification Search
CPC ........ F03B 15/04; F03B 17/005; F03B 13/06; A01K 61/60
See application file for complete search history.

(56) References Cited

U.S. PATENT DOCUMENTS

| | | | |
|---|---|---|---|
| 5,106,230 A | 4/1992 | Finley | |
| 11,708,819 B2* | 7/2023 | Kirch | F03G 7/0252 60/398 |
| 2009/0301089 A1* | 12/2009 | Bollinger | F01K 27/00 60/648 |
| 2012/0124569 A1* | 5/2012 | Park | G06F 8/61 717/171 |
| 2013/0168961 A1* | 7/2013 | Stahlkopf | F01K 25/04 290/7 |
| 2013/0232867 A1 | 9/2013 | Orridge | |
| 2014/0097145 A1 | 4/2014 | Browning | |
| 2024/0117938 A1* | 4/2024 | Simpson | F17C 5/06 |

* cited by examiner

*Primary Examiner* — Abiy Teka
(74) *Attorney, Agent, or Firm* — CIONCA IP Law P.C.

(57) ABSTRACT

Provided herein are systems and methods for energy capture, energy storage, and stored energy translation to mechanical work, having: a piston drive pump cylinder tube for housing a first volume of liquid, and a piston drive pump; wherein the piston drive pump is configured for motion; an energy storage tank for storage of a first volume of air and a second volume of liquid wherein the first volume of air is compressed air; a recovery tank for housing a second volume of air and a third volume of liquid; a liquid driven turbine connected to the energy storage tank and in communication with the second volume of liquid of the energy storage tank; a plurality of unidirectional liquid tubes and air tubes for connecting the piston drive cylinder tube, the energy storage tank, and the recovery tank; an impeller associated with the turbine; and a subsystem for energy generation.

20 Claims, 16 Drawing Sheets

100

101

100

101

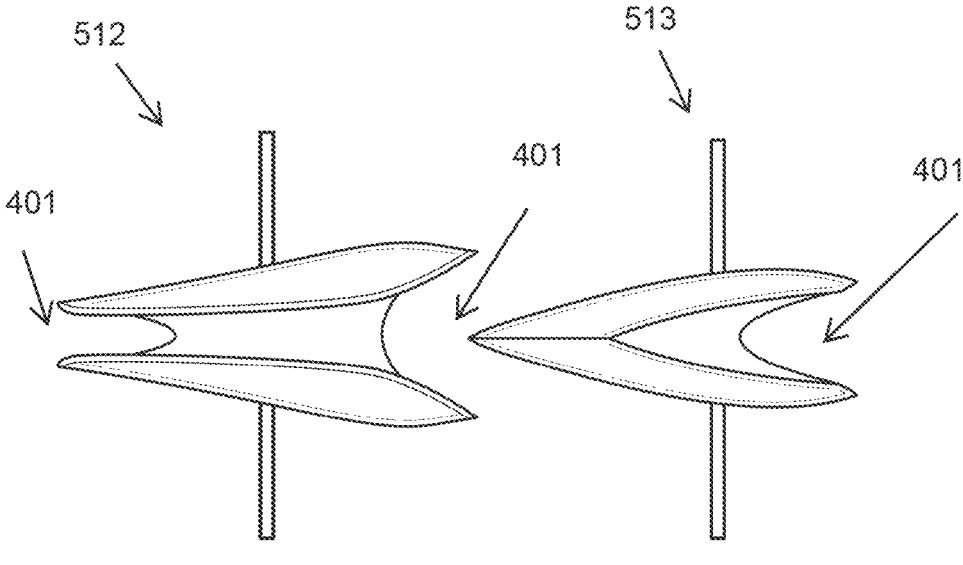
FIG. 5A          FIG. 5B
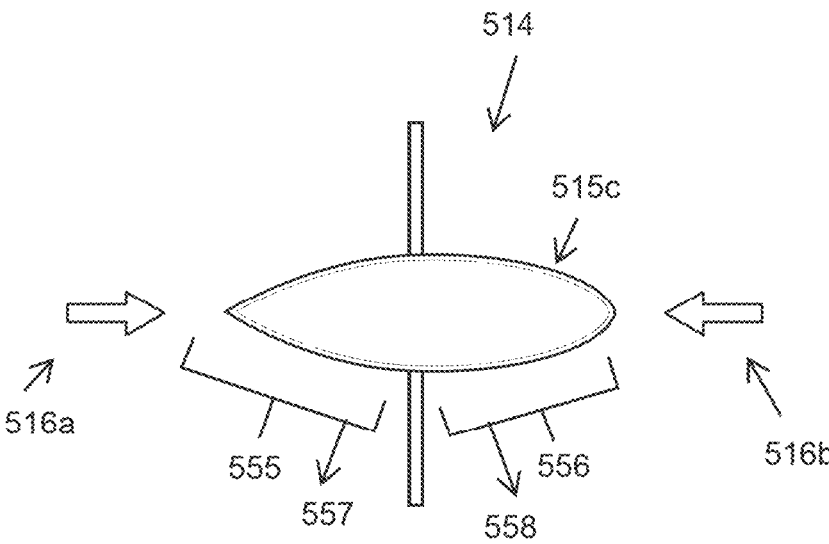
FIG. 5C - Prior Art

707

709

701

708

710

711

709

713

707

701

708

712

713

SYSTEM AND METHODS FOR OCEANIC AND ATMOSPHERIC CARBON DIOXIDE AND CLIMATE MANAGEMENT, ALGAL FOSTERING, AND INITIATION AND MAINTENANCE OF FISHERIES BY DEEPER NUTRIENT RICH WATER PUMPING

BACKGROUND OF INVENTION

1. Field of the Invention

The invention relates generally to a deliberately created man-made upwelling fishery system that also acts to remove and sequester large amounts of carbon dioxide from the atmosphere.

2. Description of the Related Art

Generally, there exists a problem of carbon dioxide buildup in the atmosphere, with the result being a global warming crisis. There also exists a problem of depleted global fish stocks. There is a need for a solution to both of these problems. This invention provides a solution to both problems. The invention acts to bring and keep the nutrient-rich waters found deeper in the global oceans to the surface. The invention seeks to do this in the most cost effective and efficient manner and offers a meaningful solution to accomplish this. The invention therefore acts to fix and sequester large quantities of CO2 gas into fixed carbon. It acts to most effectively bring deeper nutrient-rich water to the surface of the ocean, (referred to as the euphotic zone), and keep the nutrient-rich waters there, such that a prolific ecosystem may develop. This ecosystem would include a fishery that could be harvested.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Generally provided herein are systems and methods for energy capture systems, energy storage systems, and energy transfer systems, which may contain elements or components that each could be used alone or in any combination with each other and may be used alone or in combination with utilization of nutrient-rich water. Accordingly, provided herein are systems and methods of utilizing nutrient-rich water that sits deeper in the ocean, by pumping the water up to the surface of the ocean for the purpose of fueling phytoplankton growth and the associated marine ecosystems that develop from such a food source.

In some embodiments, an upwelling fishery is generated which mimics the action and effect of natural upwelling fisheries. These created upwelling fisheries may be located to best serve selected markets and can be harvested with the intention of maximizing the fishery's sustainable yield. The man-made created upwelling fishery can be referred to as OCCMAFFIMS (Oceanic Climate CO$_2$ Mitigation, Algal Fostering, Fishery Initiating and Maintaining System) or generally as a man made, actively generated, or created fishery system, or CO$_2$ gas fixing and sequestering system. Generally, the systems disclosed herein may also be referred to as a "specialized hose and buoy pumping system," or as a "specialized energy capture and storage system." It should be understood however, that while the terms are used for general disclosure of the systems described herein, the systems may include any number of elements and features as disclosed.

Generally, the upwelling fishery caused or created by the systems disclosed is designed to also at the same time absorb enormous amounts of carbon dioxide from the atmosphere into organic matter in the form of phytoplankton and all of its associated ecosystem growth. The organic matter created as aproduct of the ecosystem may then end up sequestered from the atmosphere through a variety of channels, such as, for example:

A. Deep ocean sequestration. Dead plankton, other marine organisms, and other organic matter ("marine snow") sink to the seafloor and effectively become sequestered in the cold, low oxygen conditions. This is referred to as a carbon "sink" and the Earth's oil deposits are formed in such a way.

B. Sustainably encouraging and maintaining substantially larger base populations of oceanic wildlife globally. The systems disclosed herein would offer an avenue to help address declining oceanic fish stocks and address the world's ever-increasing fishing pressures.

C. Replacement of traditional high carbon footprint animal proteins for human consumption. A natural/wild seafood climate positive, carbon negative, carbon sequestering alternative can be provided by the generated fisheries.

D. Replacement of some fossil fuel-based fertilizers with fishmeal alternatives.

E. Providing a potential biofuel source. Use of algae as a fuel may offer an alternative to current fossil fuels.

F. Promotion of cloud formation. Algae in the phytoplankton also release dimethyl sulfide, a compound that acts to promote cloud formation. Clouds generally act to shade and help cool the Earth's surface, thus further mitigating the global warming effects of increased atmospheric CO$_2$.

Generally, the ecosystems which develop around the natural upwelling fisheries are prolific and represent the highest concentrations of marine life on the planet. Some of the embodiments of the invention disclosed herein allow for the creation of a man-made upwelling fishery and with the implementation of a harvest management strategy that promotes the greatest or maximized sustainable harvest of the system, it follows that the greatest amount of CO$_2$ gas can be removed and sequestered from the atmosphere. This harvest strategy can also affect the proportions of fecal pellet sizes most prevalent in the system which has a meaningful impact on the amount of organic matter that reaches the sea floor where CO$_2$ sequestration will occur. As such it is an important part of the overall design and implementation of the system.

Provided herein are systems for causing an upwelling with the intention to create a fishery without altering the natural thermoclines in a body of water, comprising: a pump housed in a floating buoy; and a heat exchanger hose comprising a plurality of protrusions; wherein the heat exchanger hose and the pump are configured to pump water from a first depth of the body of water to a second depth of the body of water, the second depth being closer to the surface of the body of water than the first depth; wherein the pumped water is nutrient-rich water; and wherein the plurality of protrusions is present and configured for accelerating heat transfer from surrounding waters to the colder pumped water within the heat exchanger hose; and wherein the system is configured to release the pumped water only when it is warmed to around or approximately the ambient water temperature of the second depth of the body of water, such that the pumped water remains at the second depth without immediately sinking back down to the first depth based upon its density, which is predominantly temperature linked.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 5A-5B depict side views of Wells turbine blades, according to an aspect.

FIG. 5C depicts a side view of a traditional Wells turbine, according to an aspect.

DETAILED DESCRIPTION

Figure 1:
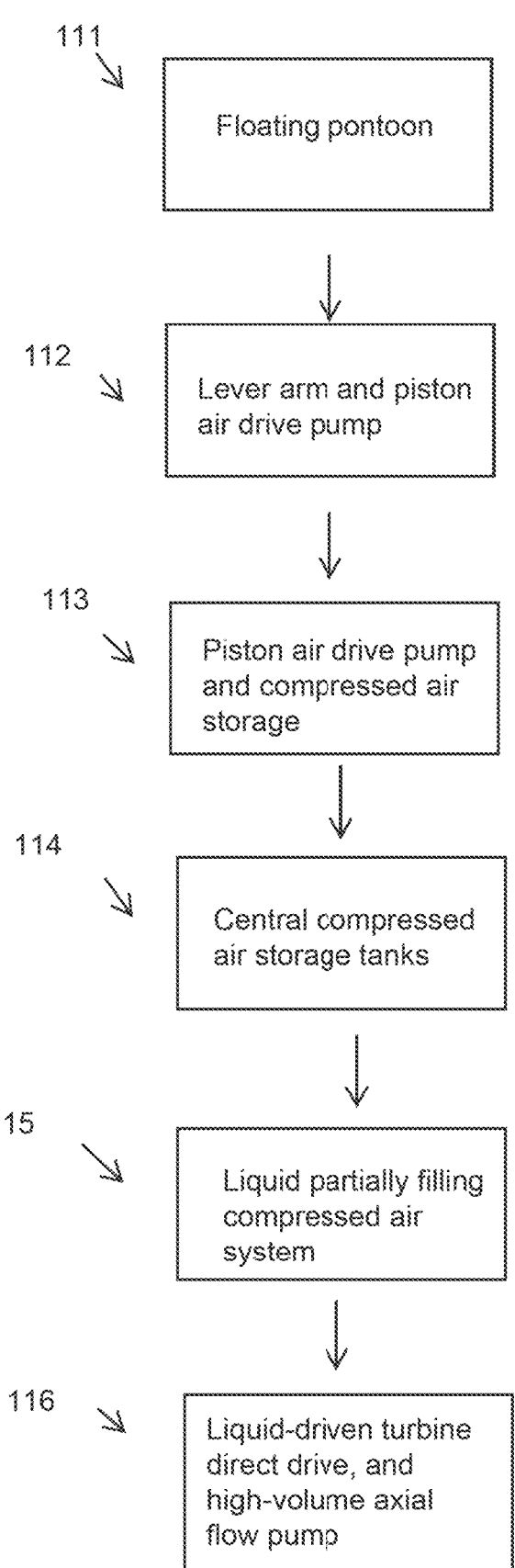
FIG. 1 is a schematic flow chart showing general mechanisms of the equipment and associated energy transfers thereof, and of the energy capture and storage systems disclosed herein.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention.

In some embodiments, the basic unit of the hose and buoy systems disclosed herein is a high volumetric flow electric pump housed in a floating buoy. The buoy may use solar, wave energy and wind energy sources (or any combination of the three, or any other suitable sources) to power the pump. The geographical region that the buoy is placed in may dictate which sources are most appropriate.

In some embodiments, nutrient-rich water is brought up from depths of around 800 meters (m) through a hose. Generally, oceanic thermoclines pass through 80% of their temperature range within the top 600 m of the ocean. Typically, nutrient concentrations (nitrogen (N) and phosphorus (P)) in the oceans are at roughly their maximum concentrations from depths of 700 m and below.

The waters being pumped up to the surface are from a deeper, first depth of water, and pumped to a second depth at the surface of the water, and this pumped water generally is released only after a period of time, when they are at approximately the ambient surface water temperature to ensure that this deep nutrient-rich water remains at the surface based on its thermal density. Generally, the period of time during which the pumped water remains near the surface is until all or at least some of nutrients—and generally preferably all nturients—are used by the algae, such as nearby growing algae cultures and algae blooms. Accordingly, the period of time could vary depending on factors such as water density, amount of algae in the area, and so on. The saline density of the pumped water can also contribute to ensuring that the water remains at the surface level without immediately sinking back down to the level from which it was pumped. Depending upon the geographical location surface waters may experience evaporation, which tends to make them slightly more saline dense than waters beneath them. Selection of locations where the halocline density reinforces, or at the very least does not overwhelm the thermal density considerations, are some aspects to be considered in the invention.

In some embodiments, wherein the heat exchanger hose and the pump, which could be electric, or mechanical direct drive, or any other suitable type of pump, are configured to pump water from a first depth of the body of water to a second depth of the body of water, the second depth being closer to the surface of the body of water than the first depth. The design of the system brings these nutrient-rich waters to the surface as quickly and as efficiently as possible. If the waters pumped up and released at the surface are colder and denser than the surface waters, they will simply sink back down into the depths. It is therefore vital that the nutrient rich waters being pumped to the surface are warmed to approximately the sea surface ambient temperature, or about the temperature of the water of the second depth of the body of water, and it is economically important to do so as efficiently, cost effectively and as rapidly as possible, such that the water does not immediately sink back down to the first depth of the body of water, wasting the energy used in pumping and defeating the purpose of the system.

Generally, also provided herein are disclosures related to systems for a modified wells turbine, a compressed air energy storage system which uses a liquid interface for maximized efficiency to transfer the stored potential energy back into mechanical work, and systems for creating fishery upwellings which may use the above-mentioned disclosures as component options within the system. Several key considerations for such systems are as follows:

1) Using a long lever arm to amplify and maximize the pressure to which a compressed air storage "battery" can be filled 2) Using a piston drive pump to maximize energy capture per wave when the system is used in water 3) Using a unidirectional heat transfer and/or insulating materials such that heat energy created by compressing air stays in the system instead of being lost from any air pumps; this heat energy translates to increased stored air pressure which can then be converted or translated into useful mechanical work 4) A compressed air-driven pump or turbine may have lowered efficiency as the released expanding air first draws heat from its environment, then upon impact with the turbine vanes, is compressed again and translates a percentage of its energy back into heat rather than into the mechanical work of making the turbine move-turbine movement being all that is needed to accomplish useful work. It is generally known and understood that wind turbine energy systems may have efficiencies as low as approximately 45-50%, and water-driven turbines such as dams generally operate at approximately 95% efficiency of energy translation. Accordingly, one embodiment of the systems disclosed herein therefore uses an incompressible liquid such as water or oil as an interface between the compressed air and the turbine vane therefore accomplishing an energy transfer efficiency in the 95% range.

FIG. 1 is a schematic flow chart showing general mechanisms of the equipment and associated energy transfers thereof, and of the energy capture and storage systems disclosed herein. Generally, this equipment may be used in water for energy capture. These equipment parts are shown and described in further detail in subsequent figures herein.

Step 111 refers to floating pontoons: Wave motion energy is captured through use of buoyancy force. Any suitable floating pontoon or equivalent may be used. The higher the volume of displacement of ocean wave water, the greater the potential upwards force that is caused. Additionally, the lighter the weight of the pontoon, the greater the upwards force that is caused (Archimedes principle). The energy captured will be equivalent to the work done minus any friction loss. That is, work=force×distance traveled (the upthrust force on the floating pontoon multiplied by the distance it travels). As the pontoon is progressively submerged, it exerts greater and greater upthrust force. The weight of the pontoon can keep it from "hanging" in the air when the wave retreats, such that the pontoon can be kept on the surface of the water at most or all times. In some embodiments, the pontoon may include a light mechanical spring pushing the pontoon back down to reset, and assist recoil. As another example, a modest/low pressure in a chamber (discussed in further detail when referring to element 194 herein, of FIG. 19) can act as a spring to gently push the piston drive pump through the recoil phase.

Step 112 refers to the lever arm and piston drive air pump. The buoyancy force of the floating pontoon is applied/transferred through a lever arm which serves to increase the potential applied force. The lever arm is connected to a piston drive air pump which fills a compressed air storage unit (e.g., a scuba tank, or any other suitable storage unit). The compressed air storage is acting as an energy storage, effectively acting as a compressed air storage "battery." The lever arm length can be used to effectively increase the pressure to which the compressed air storage may be pumped.

Step 113 refers to the piston air drive pump and compressed air storage. The compressed air is discussed in further detail herein when referring to FIGS. 18 and 19. The lever arm drives a piston air pump, which fills the compressed air storage batteries. The piston drive air pumps and compressed air storage batteries are all housed in a thermally non-conductive envelope. Heat energy is a by-product of compressing air, and rather than allow that energy to be lost to the general environment, it is retained by the insulating envelope such that it can be translated back into mechanical work. The thermally non-conductive envelope may also be transparent so that it can also absorb sunlight energy passively into the compressed air storage batteries. This acts to effectively "top up" the pressure through gas expansion in the compressed air storage batteries through passive solar energy heat absorption.

Step 114 refers to the central compressed air storage tanks. The initial compressed air storage units (e.g., the scuba tanks or other suitable containers) all feed into two central compressed air storage units which are connected in series. The purpose of these units is to directly feed the liquid interfaced turbine. They act to help regulate and keep the pressure feeding into/driving the liquid driven turbines very consistent. The purpose of two tanks is so that as variations in pressure occur with surges coming into the first tank from the piston drive air pumps a steadier flow moves into the second tank, and an even steadier flow leaves the second tank to drive the liquid interface turbine. The surges are dampened by the two sequential tanks and not transferred to the turbine.

Step 115 refers to the liquid partially filling the compressed air system. The systems disclosed herein may use a liquid interface to transfer the potential energy stored in the compressed air 'battery' into the kinetic energy of a water turbine. The liquid is collected in a lower pressure holding reservoir/tank after it passes through the water turbine. From there it is recycled and drawn back through the piston drive pumps into the beginning of the liquid interfaced compressed air battery loop. The liquid interface increases the potential efficiency of energy transfer from stored air into mechanical motion into approximately the 95% range. The liquid interface circulates through the whole system constantly. The storage containers and flow valves are oriented such that the gravitational force is used and acts to constantly segregate the liquid and air flows therefore maintaining the liquid interface/liquid driven turbine dynamic in the compressed air system.

Step 115 refers to the liquid driven turbine direct drive, which is connected or geared into a high-volume axial flow pump. The liquid driven turbine may be geared to or have a direct drive to the water pump impeller (e.g., such as in a high-volume axial flow pump) which is bringing the nutrient rich deeper ocean waters to the surface through the heat exchanger hoses. These hoses are shown and discussed in further detail below.

Figure 2A:
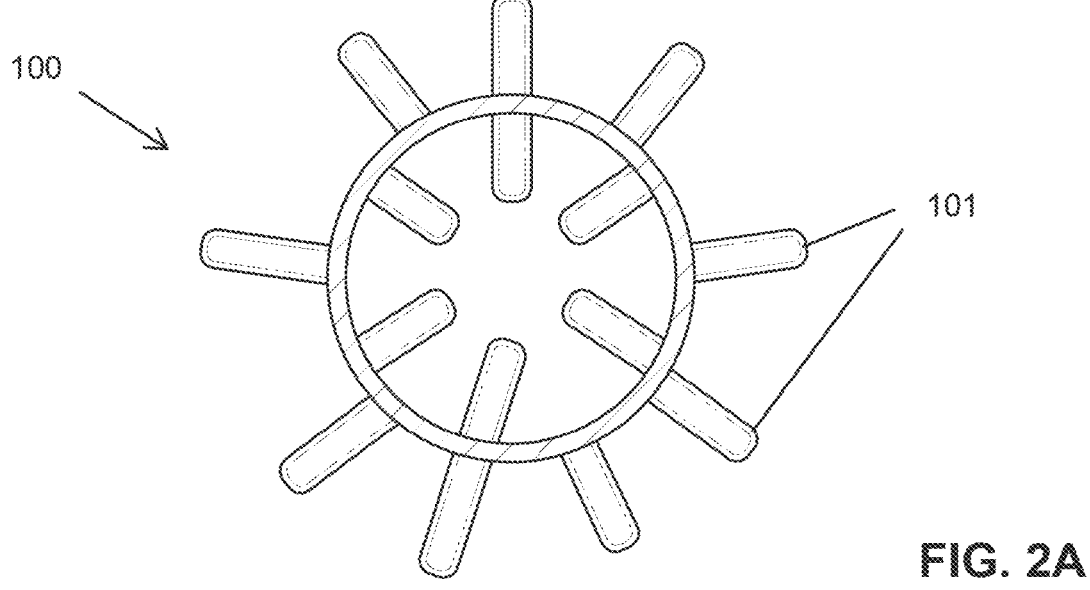
FIGS. 2A and 2B depict a cross-sectional transverse view and a perspective view, respectively, of a hose for pumping water, used in a hose and buoy system for pumping water, according to an aspect.
Figure 2B:
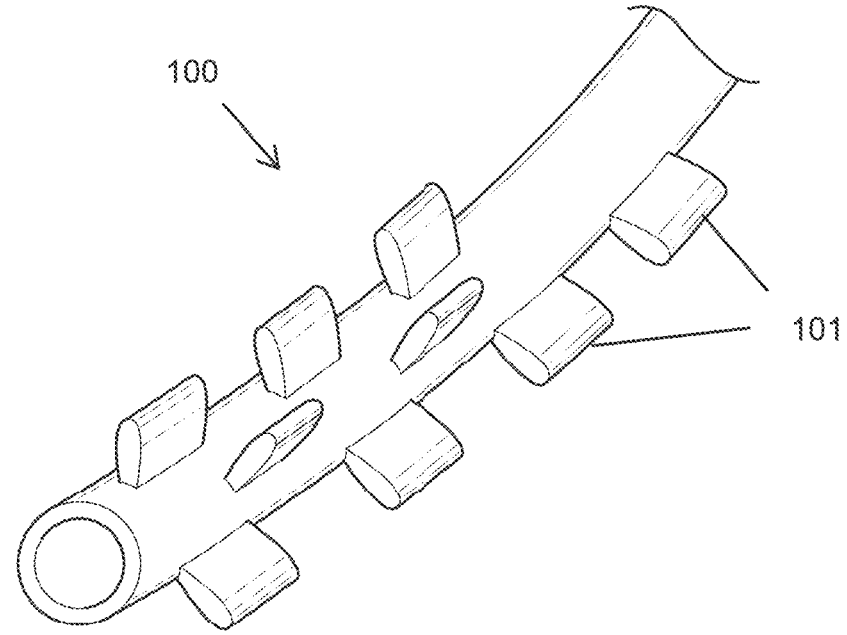

FIGS. 2A and 2B depict a cross-sectional transverse view and a perspective view, respectively, of a hose 100 for pumping water (generally referred to herein as a "heat exchanger hose," or "hose"), used in a hose and buoy system for pumping water, according to an aspect. The hose for pumping water can be a thermally conductive hose incorporating several important design features.

The protrusions shown in FIGS. 2A and 2B as 101 are made of materials which are excellent heat conductors (significantly faster than water itself) and project into the center of the hose and extend outwards from the exterior surface of the hose. These protrusions have a similar effect to villi in the intestine, by increasing the surface area of the hose in contact with the water internally and externally, and thereby act to more rapidly transfer heat from the warmer surrounding ocean into the cooler waters being pumped up inside the hose. The protrusions also act to create some turbulence inside the hose which may act to increase and speed up the heat transfer.

The hoses and associated protrusions of the hoses are impregnated with cost effective heat conducting materials, such as low-density pyrolytic graphite (wherein thermal conductivity is up to 1950 W/mK), boron arsenide, and any other suitable materials, to accelerate and maximize the heat transfer rate from the ocean water external to the hose, to the nutrient-rich ocean water being pumped up inside the hose.

The oceanic thermocline profile where the hose is to be located is a consideration used in calculating and optimizing the hose diameter selection to effect the fastest rate of pumping the largest possible volume. Generally, a pump rate that moves the greatest volume of water the fastest while still accomplishing fully effective heat exchange is desirable.

At times, the pumping system may also need to slow down the pump speed to allow time for the heat exchanger hose to do its job and equalize temperatures between the ascending water inside the hose and the surrounding surface waters. In some embodiments, the volume flow can be maintained at a high level, and a greater heat exchanger hose length for the water to flow through can be used. This greater length of hose can be situated in the warmest ocean layers (the surface) to maximize its effect as long as there is a substantial horizontally flowing current/tidal flow. In some embodiments, the system may use a simple thermostatic feedback control to accomplish slower pumping speeds, and or switching to increased hose length.

In some embodiments, the hose design deliberately increases turbulence inside and around the hose to increase the rate of heat transfer from the warmer external waters to the water inside the hose. The result is a reduction in flow rate and a small release of heat from friction into the water. Optimization of these several variables can be provided for certain embodiments of the invention.

Figure 3:
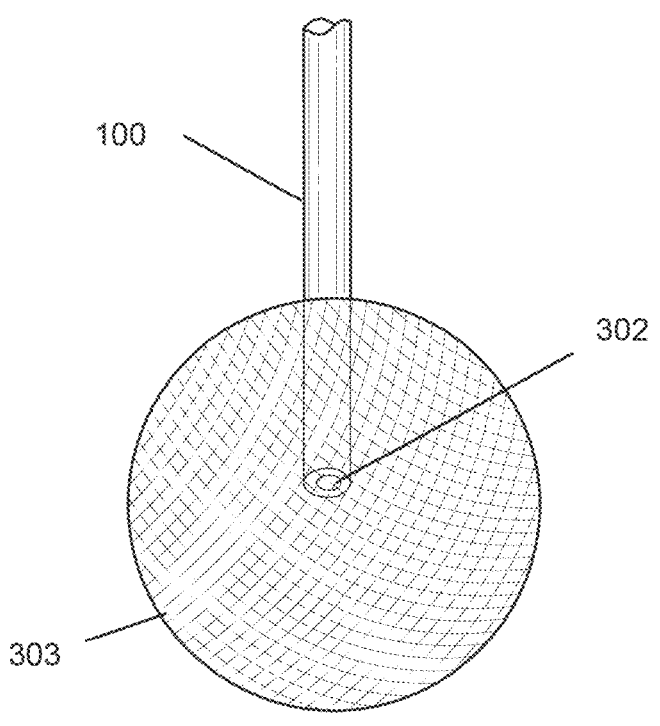
FIG. 3 depicts a perspective view of a spherical mesh ball acting as a filter on the end of a hose at its water intake point, according to an aspect.

FIG. 3 depicts a perspective view of a spherical mesh ball 303 acting as a filter on the end of a hose 100 at its water intake point 302, according to an aspect. In some embodiments, the foot of the hose where water intake occurs, indicated by 302, has a spherical shaped mesh or screen attachment 303 that acts as a filter over the hose intake. This design acts to filter out any debris or sea life that could be sucked into the hose and cause a clog. In some embodiments, this design can specifically reduce the pressure of suction against the screen based on increasing the radius of the sphere used. The mesh size may be selected to allow for maximized water flow with minimized potential for blockage by debris. The larger the diameter of the spherical screen, the lower the suction pressure is at its surface, and this dramatically reduces the likelihood of any clogging of the screen and hose intake.

In some embodiments, the hose and buoy systems disclosed herein are situated near river mouths in order to use the sediment in the effluent as a means of increasing sequestration of marine snow. In some embodiments, the systems disclosed herein are preferentially located in areas where iron-containing dust is naturally blown into the ocean or other bodies of water.

In some embodiments, the buoy design also has a black hose ("black hose" or "dark hose") coiled around it above the water line, which can be incorporated into a continuation of the length of hose bringing up the nutrient-rich deeper waters when appropriate. These dark hose coils sit above the water level so that the waters being pumped to the surface can benefit from accelerated direct solar heating and/or warm air heating during the daylight hours and/or air temperatures which are warmer than the oceanic surface waters. The above-water hoses may be thermostatically incorporated into the pumping line when direct solar or air temperature warming can be of benefit. Another benefit of the dark hose is that the darker color may minimize attention and mouthing by sharks and any other ocean creatures that may disrupt or damage the equipment.

In some embodiments, mouthing by sharks or other animals may be minimized or eliminated by infusing the heat exchanger hose with chemical deterrents. These may include any suitable chemicals or substances that discourage mouthing by animals, which may be environmentally safe.

In some embodiments, mouthing by sharks or other animals may be minimized or eliminated by embedding the heat exchanger hose with a conductive mesh configured to produce an electromagnetic field, which may discourage interaction by animals.

In some embodiments, mouthing by sharks or other animals may be minimized or eliminated by incorporating an underwater speaker into the floating buoy of the system. The speaker may be configured to play sounds that may deter attention from sharks. For example, the sounds may be, but not limited to the sounds of other animals such as killer whales and bottlenose dolphins.

In some embodiments, interaction with animals may be minimized by encasing the hose 100 and any other components shown in FIGS. 2A-2B inside of a protective sleeve. In such embodiments, the hose 100 may be constructed as a single unit having an interior hose extruded within an exterior, protective hose.

If batteries, pump, and electronics are used for powering the hose and buoy system and energy capture and storage system, they are ideally located above the sea level line of the floating buoy in a sealed compartment where the lowest sealed wall of the compartment is also above the water line. In some embodiments, the drive shaft of the pump is the only item penetrating through the lower boundary of this sealed compartment and this design helps prevent salt-water damage to the sensitive electronic components in the event of any seal failure. The pump motor and drive shaft are oriented such that as they spin, they provide gyroscopic stability to the buoy.

The buoys can also include GPS locating beacons to ensure that they can be easily found and retrieved in the event of loss. The buoys may also be colored brightly for greater visibility.

In some embodiments, the invention utilizes an anchoring weight and mooring line with a buoyant platform coupling point at about 100 feet below the surface (below the most intense wave energy). In such embodiments, a mooring line having a shock absorbing design can be incorporated to dampen the stress effects of oceanic currents and wave action on the mooring line. A linkage at the platform connects the mooring to the buoy on the surface. This linkage can be uncoupled before major storm events and the surface assembly removed if desired. The linkage is also designed to be the weak point so that any wear and failure in the anchorage system occurs there first, above the platform, leaving the rest of the deeper mooring and hose still accessible to be inspected and maintained. In some embodiments, the mooring line or anchor cable runs down a sleeve in the center of or attached to the heat exchanger hose. In such embodiments, the unification of the two may help to minimize sea creatures from getting tangled or caught in between the hose and anchor line.

In some embodiments, the hose and buoy systems disclosed herein use free floating buoys which have self-motility. These buoys move with the tides and GPS self-correct for any wind or oceanic current displacement.

In some embodiments, the hose and buoy systems disclosed herein seek to promote exponential growth in algae populations. Algae populations may exhibit exponential growth when none of the requirements for growth are limiting. To pursue exponential growth potentials, the hose and buoy systems disclosed herein may be adjusted to account for various factors. For example, the individual pumping units may be arranged together in such a manner as to support exponential growth without creating over-nutrification and anoxic conditions during the hours of darkness. These are conditions which may occur when the algae blooms, which continue to divide/grow and respire at night use more oxygen than is available or was produced by photosynthesis by the smaller bloom during daylight hours. Accordingly, locations for the hose and buoy systems may be selected which take advantage of currents to maximize the spread and dispersal of nutrient-rich waters brought up by each pump. An equation that takes into consideration factors such as, but not limited to, current speed, pumping rate, and "real time" algal population density may be used to manage the systems to produce optimal results. As an example, satellite imagery may allow for accurate algal concentration feedback in real time.

Generally, pursuing exponential algal growth may comprise consideration of at least the following factors at any given site of a hose and buoy system:

A. Increasing the amount of nutrients brought up the euphotic zone, via the addition of more pumps down current.

B. Increasing the area over which nutrients are spread out, by spreading "down current" pumps further apart to avoid over-nutrification.

The factors above may dictate a system's pump positioning pattern, and the pumps' on/off times. The positionings and on/off times may vary with each individual site.

The resulting ecosystems that may develop from the use of the hose and buoy systems disclosed herein may be harvested with the intention of maximization of sustainable yield. As an example, a fish population may be fished down to 100 fish and have 60 fish harvested in one year. The remaining 40 fish may reproduce and there are once more 100 fish to be harvested the following year. This pattern may then repeat year after year and is therefore deemed sustainable. As another example, a population of the same species of fish is allowed to grow to 100 million. 60 million fish are harvested in one year and the remaining 40 million fish reproduce, such that there are again 100 million fish to be harvested in the following year. This pattern may then repeat year after year and is therefore also deemed sustainable. The second sustainable pattern would be more of a maximization of sustainable yield. It should be understood that the examples disclosed herein are for illustrative purposes and the systems provided herein are not limited to these examples. It should also be understood that any suitable harvest strategies that maximize sustainable yield may be used.

In some embodiments, the systems disclosed herein may be used to support and enhance the populations of large migratory pelagic fisheries, such as, but not limited to, those of tuna. This means that they must be deliberately and strategically located along the migratory routes where the systems will offer the greatest benefit to these populations.

Generally, the hose and buoy systems disclosed herein act in such a manner that deliberately does not change the ocean's thermocline profile. The embodiments disclosed herein maintain the oceanic thermocline profile as deeper nutrient-rich waters are brought to the surface.

In some embodiments, after pumping waters to the surface, the deeper waters that have been pumped up and warmed to surface ambient temperature are guided down slightly and released at about 50 to 100 feet below the surface, to give any outgassing $CO_2$ a greater chance to be reabsorbed by the ocean and surface phytoplankton before potentially reaching the atmosphere. The section of hose carrying the water back downwards may be thermally non-conductive. In some embodiments, the system deliberately separates the out-flow location from the heat exchanger zones in a direction perpendicular to the surface current flow direction.

Figure 4:
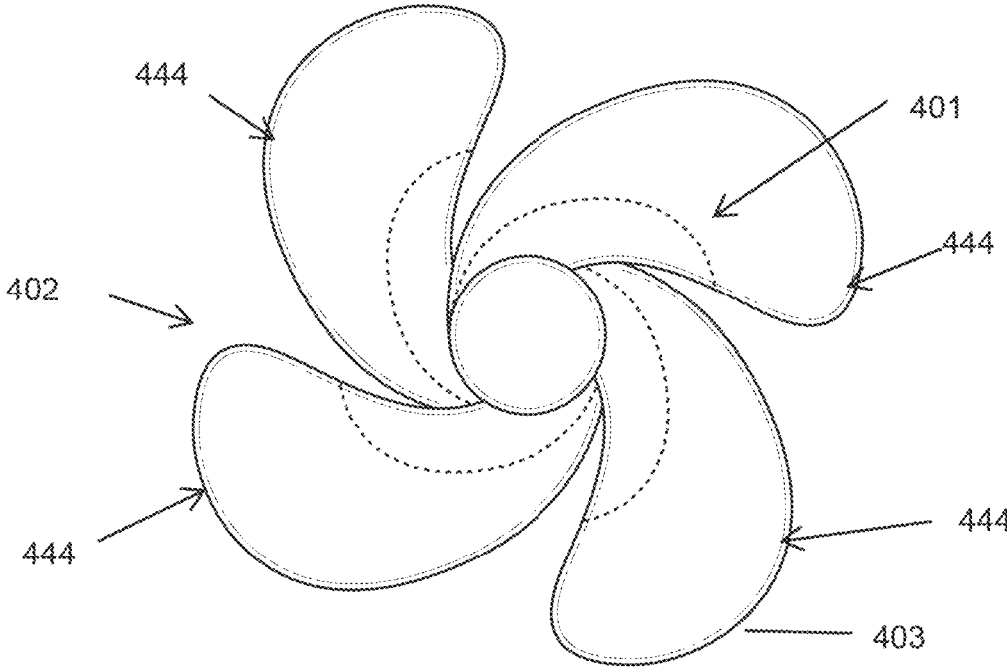
FIG. 4 depicts a top view of a wind turbine blade that may be used in a modified wells turbine of the energy capture systems disclosed herein, according to an aspect.

FIG. 4 depicts a top view of a wind turbine blade 402 that may be used in a modified wells turbine of the energy capture systems disclosed herein, according to an aspect. Each "blade" may comprise a plurality of fan blades 444. In some embodiments, a modified wells turbine airfoil blade may comprise four fan blades 444 such as the exemplary airfoil blade shown in FIG. 4. In some embodiments, the systems disclosed herein may include traditional wells turbines, or a modified wells turbine, both of which have an airfoil blade. The blades of the modified wells turbines disclosed herein may comprise a groove, represented by the dotted line 401, which can help reduce air resistance. Generally, the leading edge of the blades in the 'Modified Wells Turbine' design, shown by 403, is not perpendicular to the direction of motion when the turbine rotates. As a result, this means that there is reduced air resistance with regard to the rotation. The modified wells turbine blade is more streamlined and aerodynamically superior to the traditional Wells turbine blade.

FIGS. 5A-5B depict side views of the new Modified Wells turbine blades, according to an aspect. FIG. 5A depicts a first side view of a blade 512 for a modified wells turbine, FIG. 5B depicts a second side view of another example of a blade 513 for a modified wells turbine in showing another type of aerodynamic shaping that could be used for the airfoil blade.

FIG. 5C depicts a side view of a traditional wells turbine blade 514. The blades such as those depicted in FIGS. 5A and 5B, which are used for the modified wells turbines, may each comprise a groove 401, and are discussed in further detail herein when referring to FIGS. 6A-6B. The traditional Wells turbine blade depicted in 5C does not include a groove.

Figure 6A:
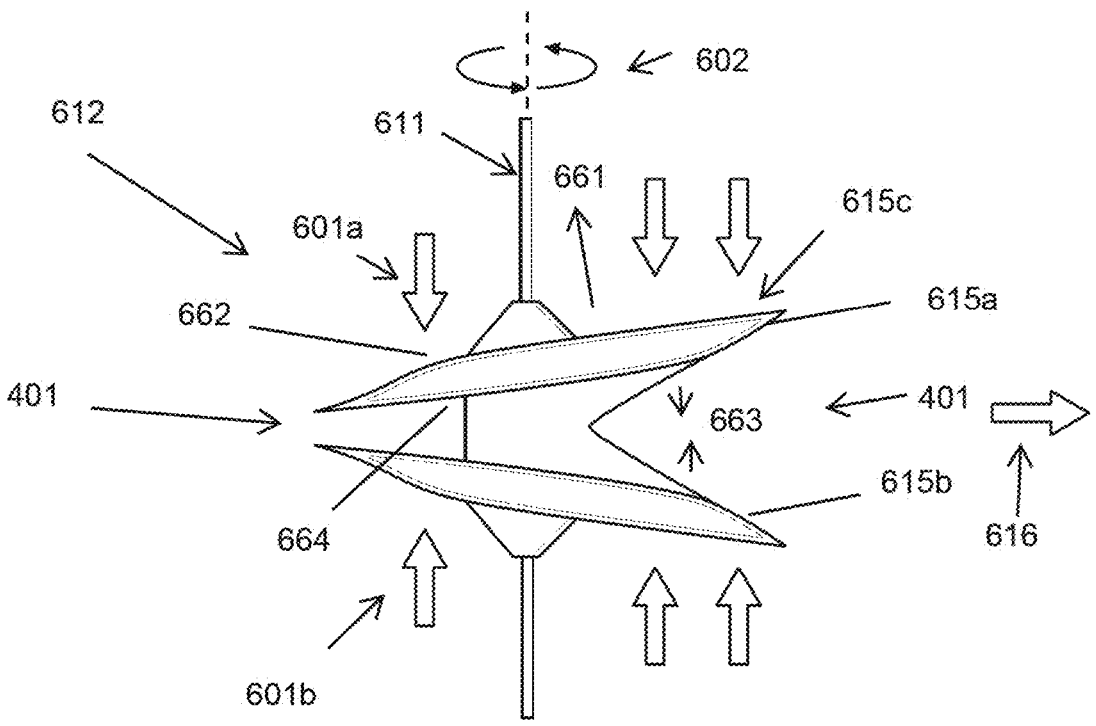
FIG. 6A depicts a side view of an embodiment of a blade for a modified wells turbine, according to an aspect.
Figure 6B:
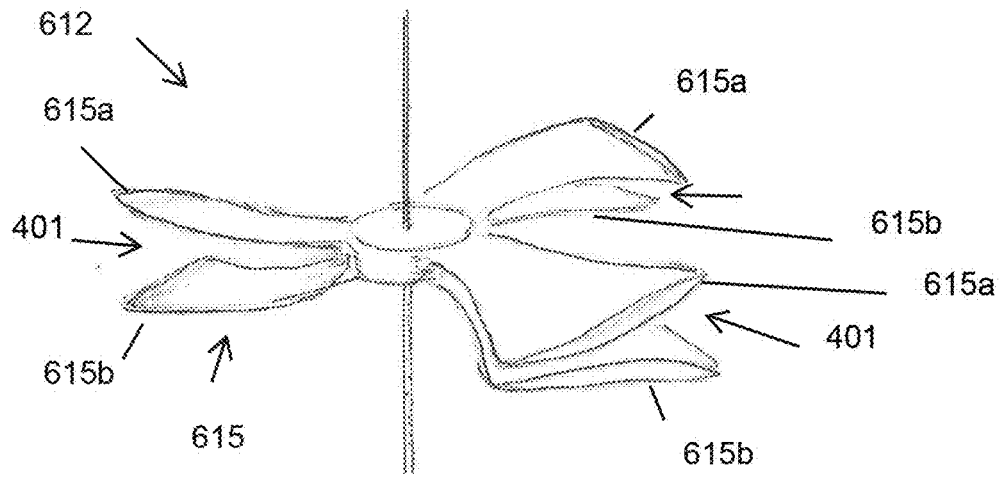
FIG. 6B depicts a perspective view of an embodiment of a blade for a modified wells turbine, according to an aspect

FIGS. 6A-6B depict a side view and a top perspective view, respectively, of another embodiment of an airfoil blade 612 for a modified wells turbine having a groove 401, according to an aspect. Generally, the embodiment shown in FIGS. 6A-6B is similar to the embodiment of a blade shown in FIG. 5A, and also includes a generator spindle 611 at the center. Generally, the groove 401 being present in the airfoil blade allows for less air resistance than the traditional Wells airfoil blade, such as the blade depicted as an example in FIG. 5C. As can be seen more clearly in the top perspective view depicted in FIG. 6B, the airfoil blade may include three fan blades 615; however, it should be understood that the modified wells turbines disclosed herein may be provided with any suitable number of individual fan blades. Each individual fan blade 615 may be divided into a top fin 615a and a bottom fin 615b by the groove 401. This design may provide certain advantages. The design of the 'Modified Wells Turbine' airfoil blade may allow for single directional rotation and energy capture from 180 degree opposing directional frequently fluctuating air movement/winds, represented by arrows 601a and 601b. In other words, the airfoil blade is configured to rotate in only a single direction, such as the direction indicated by rotational arrows 602. It should be understood that the single direction could also be in the opposite direction to rotational arrows 602 if the blade angles were reversed, but each airfoil blade as disclosed herein is configured to only rotate in a single direction, the direction of arrows 602. The 'Modified Wells Turbine' blade 612 has a direction of rotation shown by arrows 602 whether it is being pushed by air coming from direction of arrows 601a or 601b. The 180 degree bidirectional alternating winds that turn the blade are able to connect with more "forward thrust" surface in the 'Modified Wells Turbine' design, and are not hindered by connecting with "reverse" thrust surfaces such as are found on the traditional Wells turbine. The airfoil blade 612 rotates in the single direction for which it is configured for turning, whether the wind powering its rotation is coming from above or below the blade. Generally, the top surface 615c of each fan blade may be provided at a slope angle that provides thrust in only a single direction as represented in FIG. 6A. This is in contrast to the rounded nose or leading-edge 515c as shown in the prior art fan blade depicted in FIG. 5C. As wind presses downwards against this nose section it creates thrust in the reverse direction. The rounded nose section is aerodynamic, in terms of offering little resistance to the blade spinning, however the slope of its surface opposes the forward thrust created by the rest of the fan blade. The shape of the fan blade used for modified wells turbines as shown in FIG. 6A allows for creating thrust in only one direction, as represented by arrow 616, which in turn rotates the fan blade as shown by arrows 602. This may be advantageous over the fan blade depicted in FIG. 5C, which, due to the angles of the surface of the nose 515c, creates a reverse thrust opposing the 'forward' thrust caused by the majority of the blade surface. Arrows 516a and 516b indicate the opposing thrust directions. The traditional Wells turbine airfoil blades therefore may not be able to capture or transfer wind energy into electrical energy as effectively or efficiently as the 'Modified Wells Turbine' embodiment shown in at least FIGS. 6A-6B.

Absence of the groove 401 may reduce the aerodynamic qualities of the airfoil blade. The modified wells turbine itself is shown and described in more detail herein when referring to FIG. 17A.

Referring again to the traditional wells turbine of FIG. 5C, some known traditional wells turbines are provided with planes such as those shown by Plane B 555 and Plane A 556.

Generally, the normal to the surface (indicated by arrow 557) of plane B 555 has a horizontal component which acts to the right (as depicted in FIG. 5C). Similarly, the normal to the surface (indicated by arrow 558) of Plane A has a horizontal component acting to the left. The force of Plane B is stronger than the force of Plane A 556 and it therefore dictates the rotational direction. That is, the net stronger force dictates the rotational direction of the turbine.

Referring again to FIG. 6A, the modified wells turbines disclosed herein, in contrast to the traditional turbine shown in FIG. 5C, has a horizontal plane component in only one direction, the normal to this surface being shown by arrow 661. Therefore, the wind acting on the blade surface creates a horizontal force acting in only one direction. Generally, the cross section of such blades is similar to that of an airplane wing. In some embodiments, the inner surfaces are curved 664, while the outer surfaces are flat 662. As the blade spins and picks up speed, a net lift force 663 occurs on the two inner curved surfaces. The vertical (y axis) components of the two lift forces cancel out, netting to zero. The horizontal (x axis) components of the two lift forces reinforce each other and sum to assist rotation in the same direction as the force created by the wind blowing (such as up or down through the accelerator tube) against the outer flat surfaces.

It should be understood that any of the modified wells turbines disclosed herein could be constructed with considerations about the number of blades, the space between the blades, the angle of the blades, and the separation distance between the upper and lower blades, such that performance and efficiency of the modified wells turbine is optimized.

Figure 7A:
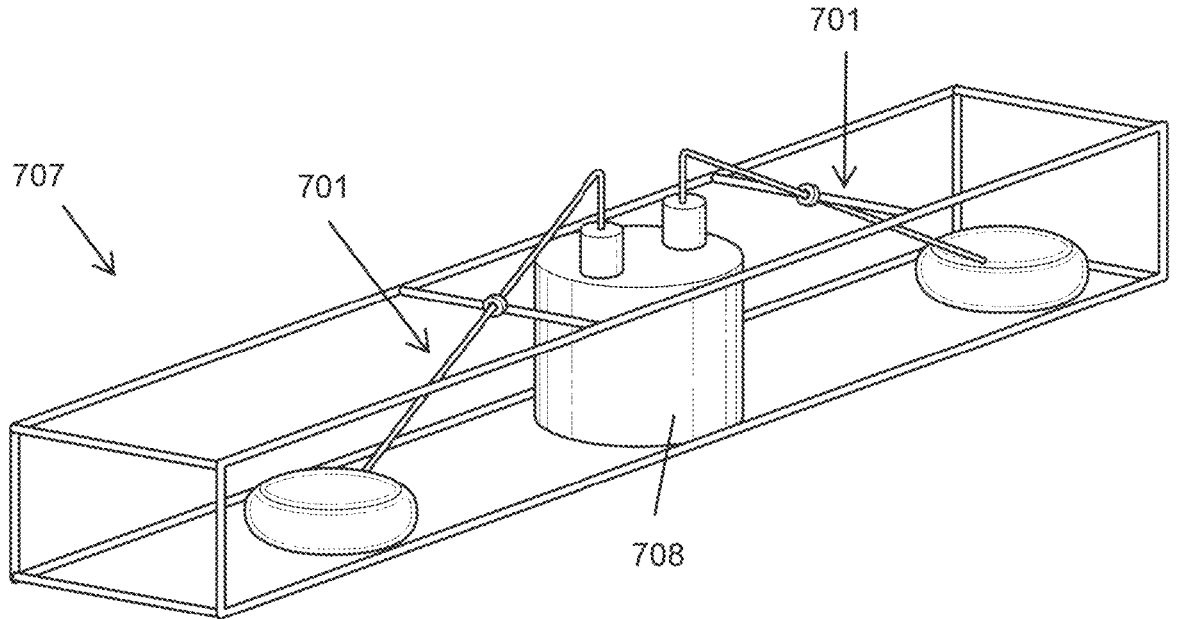
FIG. 7A depicts a top, side perspective view of a buoy having piston pumping lever arms, according to an aspect.

FIG. 7A depicts a top, side perspective view of a buoy 707 having piston pumping lever arms, according to an aspect. In some embodiments, a buoy may comprise two lever arms positioned opposite each other and in pairs. In some embodiments, a buoy may comprise multiple pairs of lever arms, each pair positioned opposite to each other around the central buoy which houses all of the air pressure tank, or scuba tank air storage units and piston air pump assemblies 708. These whole acting effectively as a compressed air 'battery' energy storage and pumping unit. For visual clarity, one pair of arms is depicted in FIG. 7A. However, generally, it should be understood that in some embodiments, the central buoy housing the compressed air storage and pumps 708 may be surrounded by pairs of lever arms, as shown and described in further detail when referring to FIG. 13.

Figure 7B:
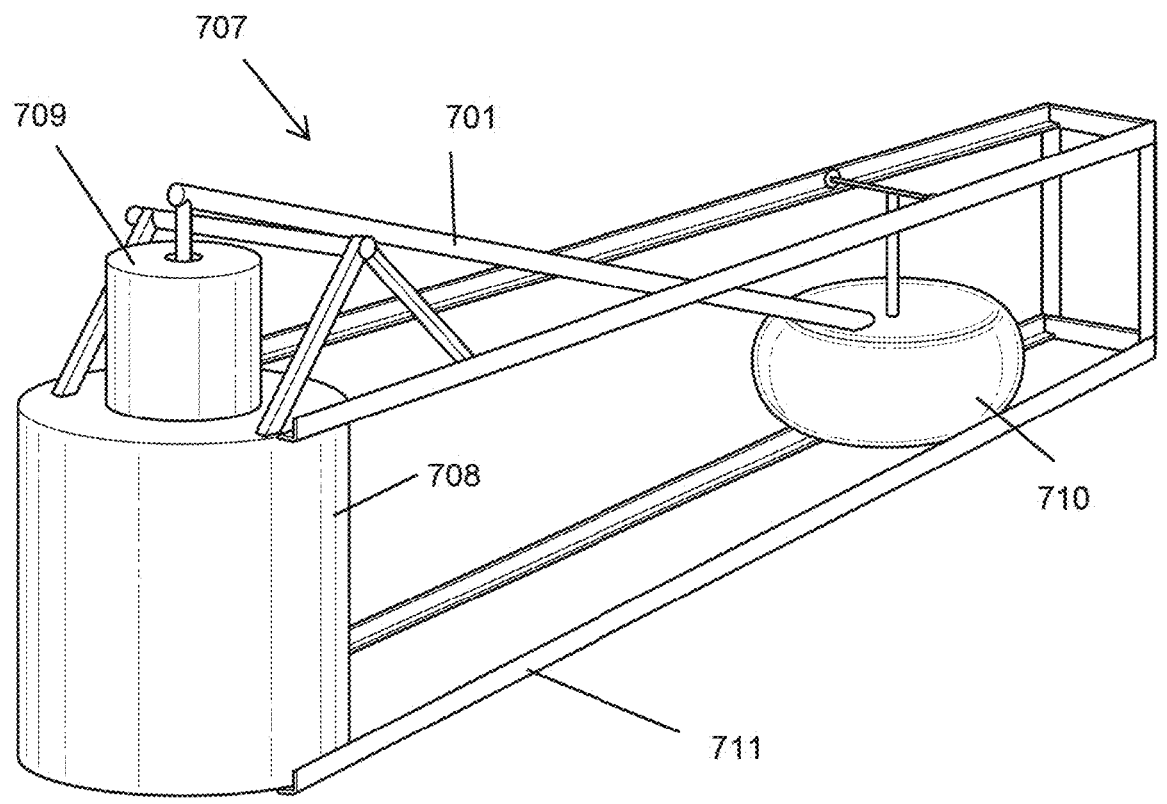
FIG. 7B depicts a partial side perspective view of a buoy showing a single lever arm 701, according to an aspect.

FIG. 7B depicts a partial side perspective view of a buoy 707 showing a single lever arm 701, according to an aspect. Again, for visual clarity, only a single lever arm 701 is shown, but it should be understood that the projecting lever arms are provided on the buoys 707 in pairs. The lever arms being provided in 180 degree opposing pairs are intended to help stabilize and maximize energy capture from the piston drive type pumping system. By having opposed buoyant members the rotational moment energy of each floating pontoon does not tend to transfer its rotation into rotation of the central buoy housing section in the water column. Instead, its rotational moment is opposed by its opposite twin in the pair and the rotational moments' act instead fully to drive the pistons in the air pumps, capturing and storing maximized energy as intended. Each lever arm 701 may end in a pontoon like float 710, configured for floating on top of water. The lever arm 701, on the opposite end of the float 710, may be connected to the piston in a piston drive air pump 709. The piston drive air pump is housed within the central body of the buoy. The lever arms 701 may use the buoyancy force as the primary driving force for the generation of energy. The movement of waves causes the lever arms to be raised and lowered. A large bore piston 709 may be used to maximize energy capture, along with a long lever arm 701. Having a long lever arm can help to amplify or magnify the force exerted by the floating pontoon in order to maximize the pressure to which the compressed air may be pumped. The float driving the long lever arm uses the buoyancy difference between itself and the remaining components of the system.

For stability and adding strength to the whole buoy system generally, pairs of lever arms may be surrounded by a supporting frame 711. The frame may be composed of metal, or any other durable material suitable for long-term use in water, for example. The supporting frame 711 may also comprise additional components such as cross bracing for structural strength (not shown here for visual clarity of the other components of the lever arm).

Figure 8:
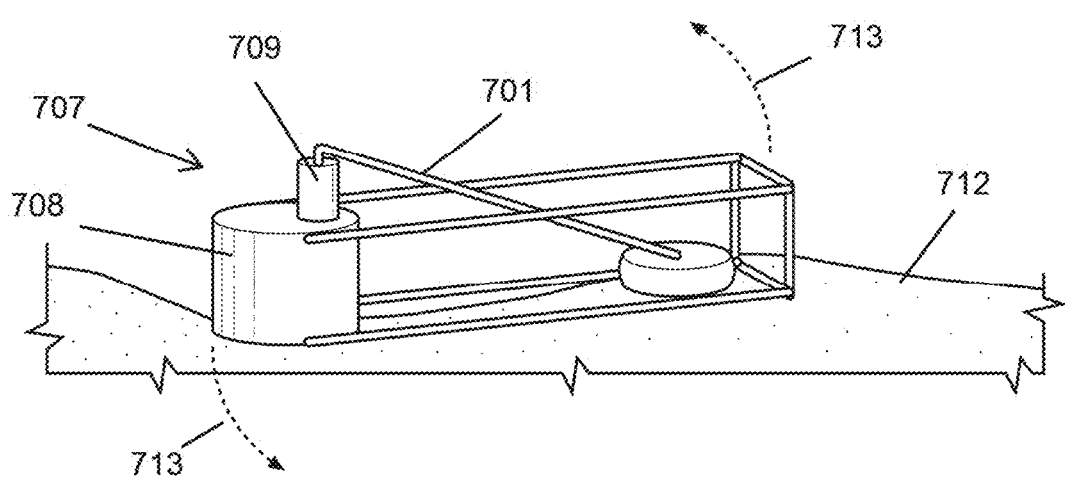
FIG. 8 depicts a partial side perspective view of a buoy having a piston pumping lever arm connected with a storage tank, shown in operation on a water surface, according to an aspect.

FIG. 8 depicts a partial side perspective view of a buoy 707 having a piston 709 pumping lever arm 701 and a buoy storage tank 708, shown in operation on a water surface 712, according to an aspect. For visual clarity, only one arm 701 portion of the buoy system is shown. Generally, as stated above, the piston air pump air compressing lever arms use buoyancy as their driving force. To control and achieve the desired pumping pressure to fill the air 'battery'/scuba tank storage, the length of the lever arm may be selected and designed as needed for each specific buoy system. The modal wavelength and amplitude of the given geographic location are considered. To prevent loss of energy translation (again, referring to the force x distance equation discussed above) of the buoyancy force created by a passing wave into stored potential energy in the scuba tanks, the design pairs the lever arm piston pumps opposite one another as described above and shown in FIG. 7A. This accordingly discourages rotation of the entire buoy unit by the lever arm float, and instead promotes compression of air by the drive piston 709. This motion of each individual lever arm is represented by the arrows 713.

Figure 9:
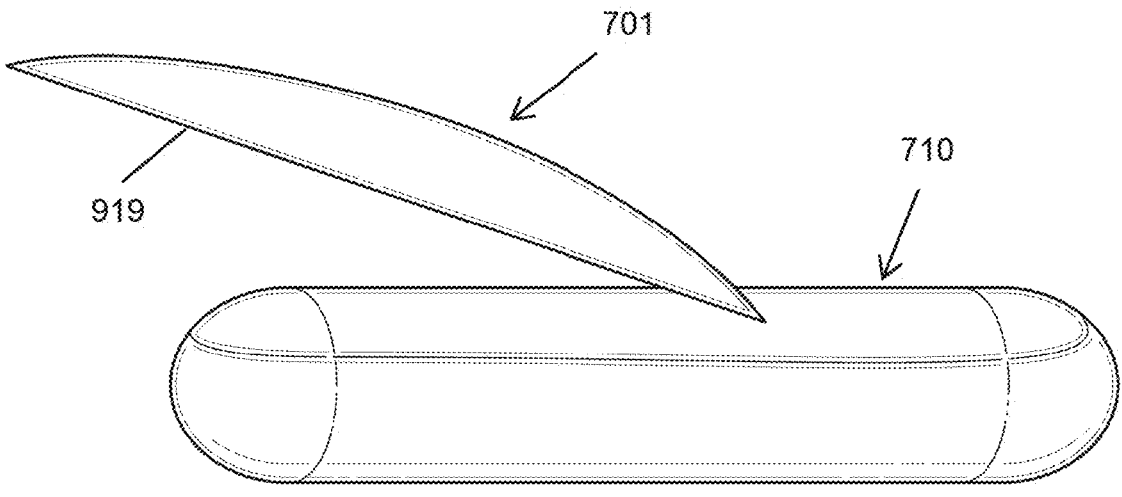
FIG. 9 depicts a side perspective view of another example of lever arm having a float, according to an aspect.

FIG. 9 depicts a side perspective view of another example of lever arm 701 having a float 710, according to an aspect. The buoys disclosed herein may be provided with any suitable size and shape of float 710 as preferred. To maximize the net buoyancy force powering the lever arm 701, the volume of displacement must be maximized with the lightest, most durable materials available and suitable for the system. As an example, the lever arm 701 may comprise a high-tensile wire 919. Accordingly, any necessary size and shape of float could be selected for a particular buoy system. Large floats, such as the exemplary float 710 shown in FIG. 9, may be selected for larger amounts of force required. Generally, a greater force acting upon the lever arm by the float in combination with a larger volume, higher compression piston drive pump, will result in a larger amount of energy captured and stored by the compressed air 'battery'/scuba tank 'battery' system per wave cycle.

Figure 10:
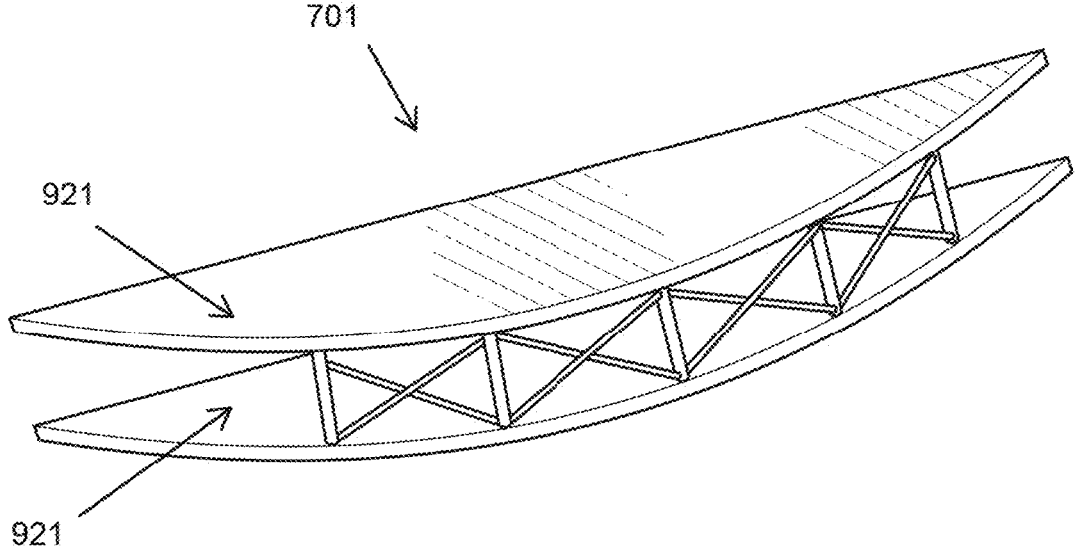
FIGS. 10-12 depict side perspective, side elevation, and top plan views, respectively, of a single lever arm unit, according to an aspect.
Figures 11, 12:
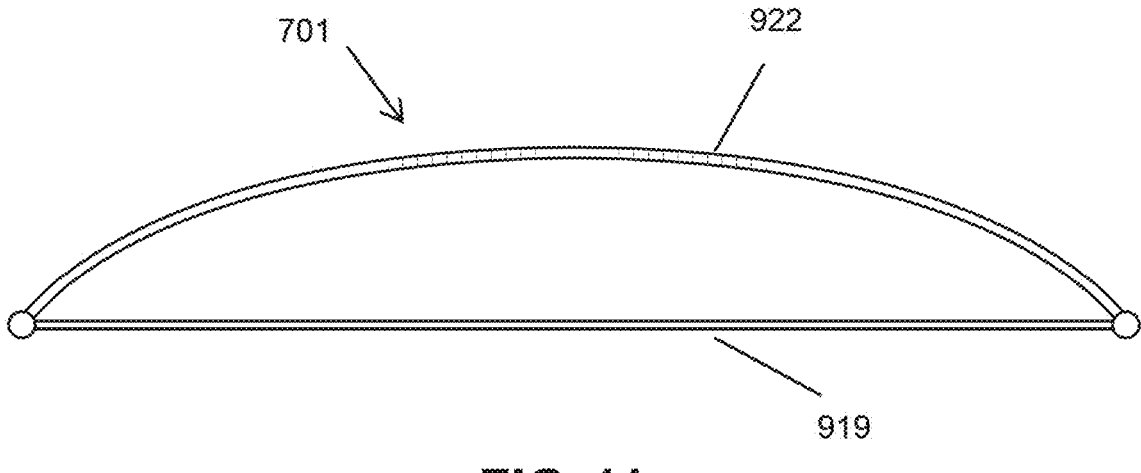

FIGS. 10-12 depict side perspective, side elevation, and top plan views, respectively, of various examples of a single lever arm unit 701, according to an aspect. In some embodiments, a bowed, lightweight lattice may be used in the construction of the arm unit. That is, a lever arm 701 may be constructed of a first side piece 121, a second side piece 122, and a latticework unit 123 connecting the first and second side pieces. Generally, this construction will provide structure and strength while also being lightweight, it creates the strongest lever arm per given weight and or best lever arm strength to weight ratio. Additionally, a bow-shaped design may also be advantageous for movement through water. Generally, all the components of the lever arms disclosed herein may be constructed from lightweight materials such as carbon fiber tubes, high-tensile wire, tungsten, high-tensile pipe, stainless steel, and so on, or any other suitable durable, lightweight materials suitable for long-term use in water. As an example, in some embodiments, the lever arm 701 may comprise two flat surfaces 921 opposite to each other, making up the first and second side pieces, as depicted in FIG. 10. In some embodiments, the flat surfaces are not provided, and instead, the lever arm comprises on both a first side and an opposite second side a curved piece 922, and a high-tensile wire 919 connecting the ends of the curved piece 922, as depicted in FIG. 11.

Figure 13:
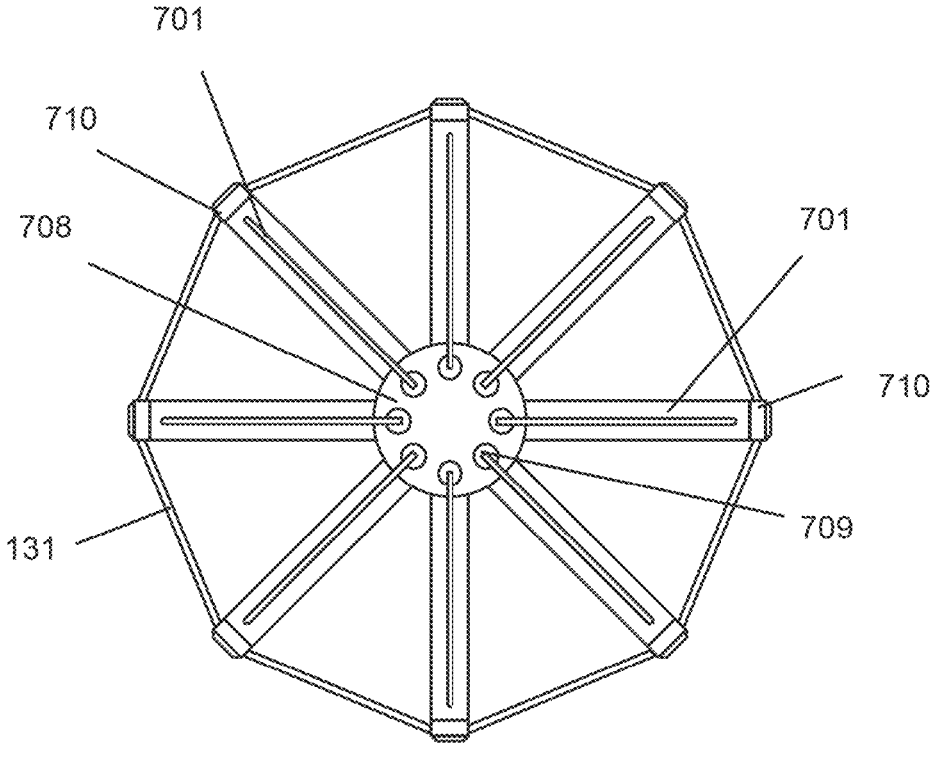
FIG. 13 depicts a top view of an exemplary buoy and lever arm system, according to an aspect.

FIG. 13 depicts a top view of an exemplary buoy and lever arm system, according to an aspect. The system depicted may include a central buoy which acts as a central holding container/area 708 which may contain piston air drive pumps 709, compressed air storage tanks, which may be scuba tanks, lever arms 701, and floats 710 connected to the lever arms. The lever arms 701 and floats 710 are radiating outwards from the central container buoy. 708. Generally, in such embodiments, the lever arms and floats may be connected with an outer framework 131 for added stability when in use in water. The outer framework 131 may be lightweight and similar to the construction of the lever arms as described when referring to FIGS. 10 and 12. wherein the outer framework may have cross members for stability.

Figure 14:
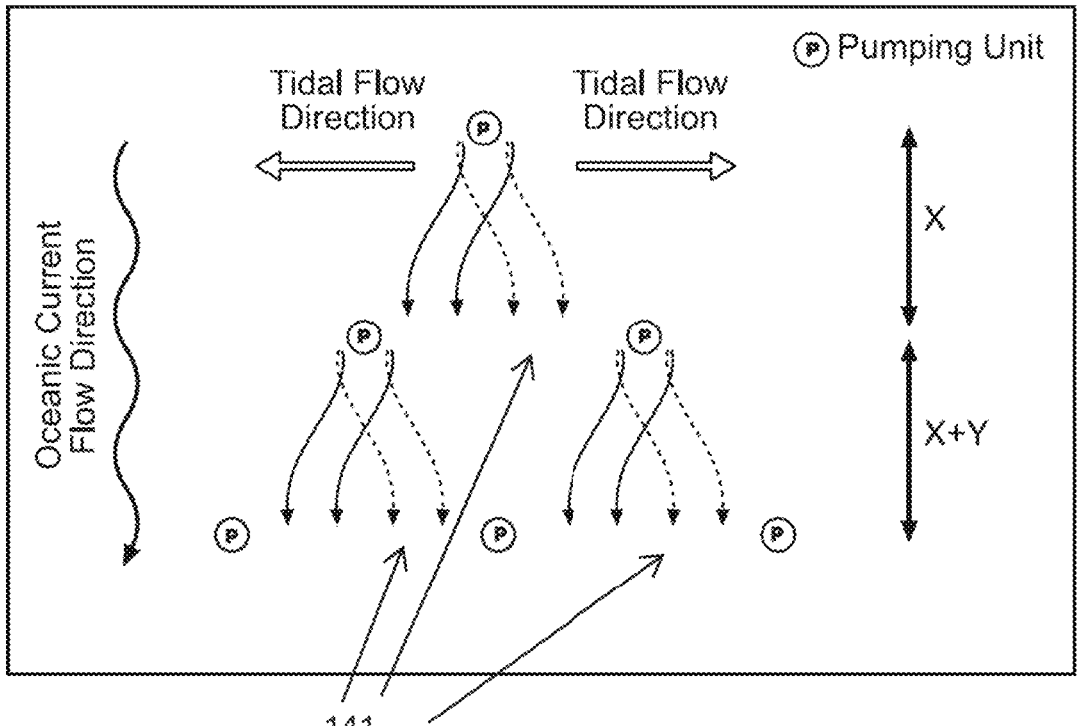
FIG. 14 is a diagram showing an exemplary unit distribution pattern for any of the energy capture systems disclosed herein, according to an aspect.

FIG. 14 is a diagram showing an exemplary unit distribution pattern for any of the energy capture systems disclosed herein, according to an aspect. Individual pumping units are represented in the diagram as shown in the diagram's legend by the circled P. Distance X shown on the right-hand side of the diagram indicates the down current distance over which nutrients have been absorbed, these nutrients being those initially brought to the surface by the first initiating line of pumps in the system and converted into algal biomass. This can vary based on sunlight duration, and water temperature of a particular location. X+Y is the distance over which nutrients brought to the water's surface by the system's subsequent series or ranks of pumps have been utilized and converted to algal biomass. Y represents the recognition that as the algal population grows it must spread to occupy greater surface area and volume so as not to become overly concentrated risking anoxia. In all instances the distances and current flow are considerations in addressing algal concentrations such that levels are kept below potentially anoxic conditions.

As the size/numbers of the algal population grows with each pumping unit added to a location, gross nutrient input also increases, such that the area the algal bloom covers must expand to keep algal concentration at an optimal level. The variables of current flow, algal growth rate (dependent on water temperature, length of sunlight exposure, and nutrient availability) will be different for each location in which the OCCMAFFIMS pumping units are used. Therefore, X and Y will vary with each location.

Figures 15, 16, 17A:
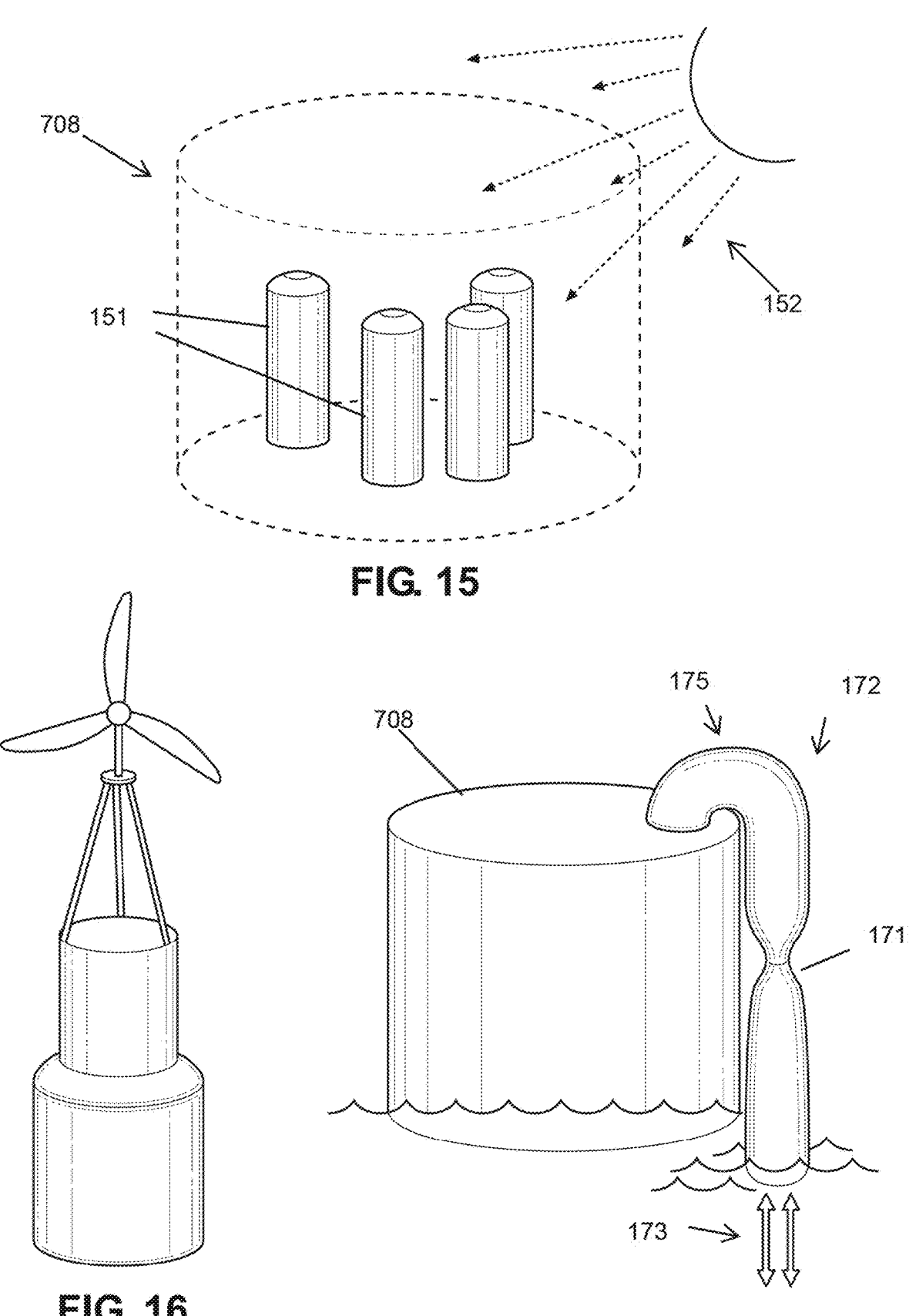
FIG. 15 depicts a diagrammatic view of the central buoy holding structure/tank, according to an aspect.
FIG. 16 depicts a side view of an example of a wind turbine energy capture system, according to an aspect.
FIG. 17A depicts an exemplary energy capture and storage system having a modified wells turbine associated with a storage tank, according to an aspect.

FIG. 15 depicts a diagrammatic view of the central buoy holding structure/tank, according to an aspect. The compressed air storage/scuba tanks, shown as 151 in FIG. 15, may be used with any of the energy capture and storage systems disclosed herein. In FIG. 15, the central buoy holding tank 708 is depicted in broken lines to indicate that the interior of the tank is also shown, and in this instance that the buoy storage structure may be transparent so that heat energy (which translates to increased pressure in the air storage units) may be absorbed through passive solar heating. The central buoy may hold energy storage units (in this instance compressed air storage/scuba tanks). It may house energy capture units such as piston drive air pumps, and it may also house the water pumps to draw up the deeper nutrient rich waters. The central buoy holding structure may house any and all of the equipment necessary to affect the objectives of the invention. The surface of the tank 708 itself may be transparent or dark in order to more efficiently absorb sunlight energy 152 through direct solar absorption. The pressure, and therefore the energy stored in the tanks can be increased from this passive solar energy absorption. These central buoy tanks 708, may be constructed of one-way, unidirectional heat transfer materials in order to facilitate movement of heat energy into the interior of the tanks and discourage that heat energy from escaping.

FIG. 16 depicts a side view of an example of a typical or exemplary wind turbine energy capture system, according to an aspect. A typical wind turbine may be presented as the exemplary turbine in FIG. 16. A typical wind turbine may make use of any or all of the energy storage mechanisms disclosed herein or others that may be appropriate or suitable.

FIG. 17A depicts an exemplary energy capture and storage system having a modified wells turbine 171 associated with a buoy storage tank 708, according to an aspect. For visual clarity, a single pipe 172, which can contain a modified wells turbine, is shown. However, a single system may include one or more modified wells turbine 171 units surrounding the tank 708.

Figure 17B:
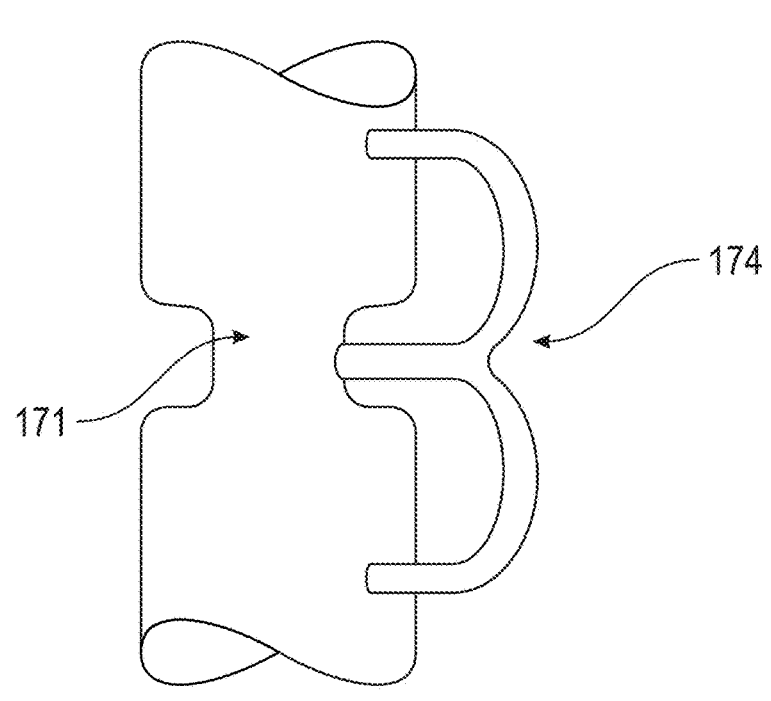
FIGS. 17B-17F depict various views of a pipe for housing a modified wells turbine system, and a flap and cover system for the pipe, according to an aspect.
Figure 17C:
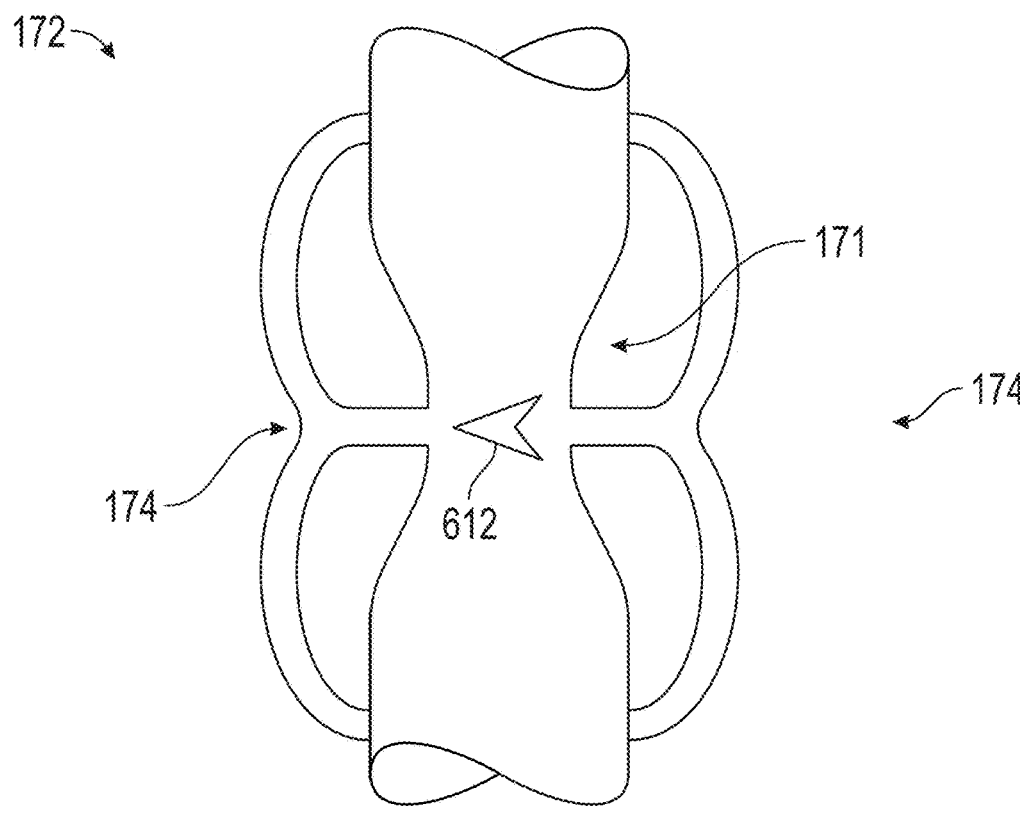

FIGS. 17B-17C depict partial side views of additional examples of pipes 172 for modified wells turbines, having one set of jug handles 174 and two sets of jug handles 174, respectively, according to an aspect. FIG. 17C shows the modified wells turbine airfoil blade 612 within the pipe, while the other depictions of the pipes 172 do not include the visual representation of the wells turbine blade for visual simplicity and clarity. However, it should be understood that any of the pipes disclosed herein may comprise any of the modified wells turbine airfoil blades disclosed herein. Generally, the modified wells turbines as shown as examples in FIGS. 4, 5A, 5B, and 6A, 6B may be incorporated into the pipes. The modified wells turbine may be located inside of a pipe 172 having a curved top 175, and a bottleneck midsection 171, as shown in FIG. 17A, wherein the modified wells turbine is located at the bottleneck midsection, because this is where air flow is most accelerated. The curved top 175 may be used for keeping salt spray or rainwater out of the pipe to minimize possible contact and exposure to any electrical windings in the Wells turbine. The air accelerator sections are designed to increase wind speed to an optimal level as air passes through the modified wells turbine, while the wave motion generates the movement of air. Wave motion, represented by arrows 173, pushes and sucks air past the modified Wells turbine.

Figures 17D, 17E, 17F:
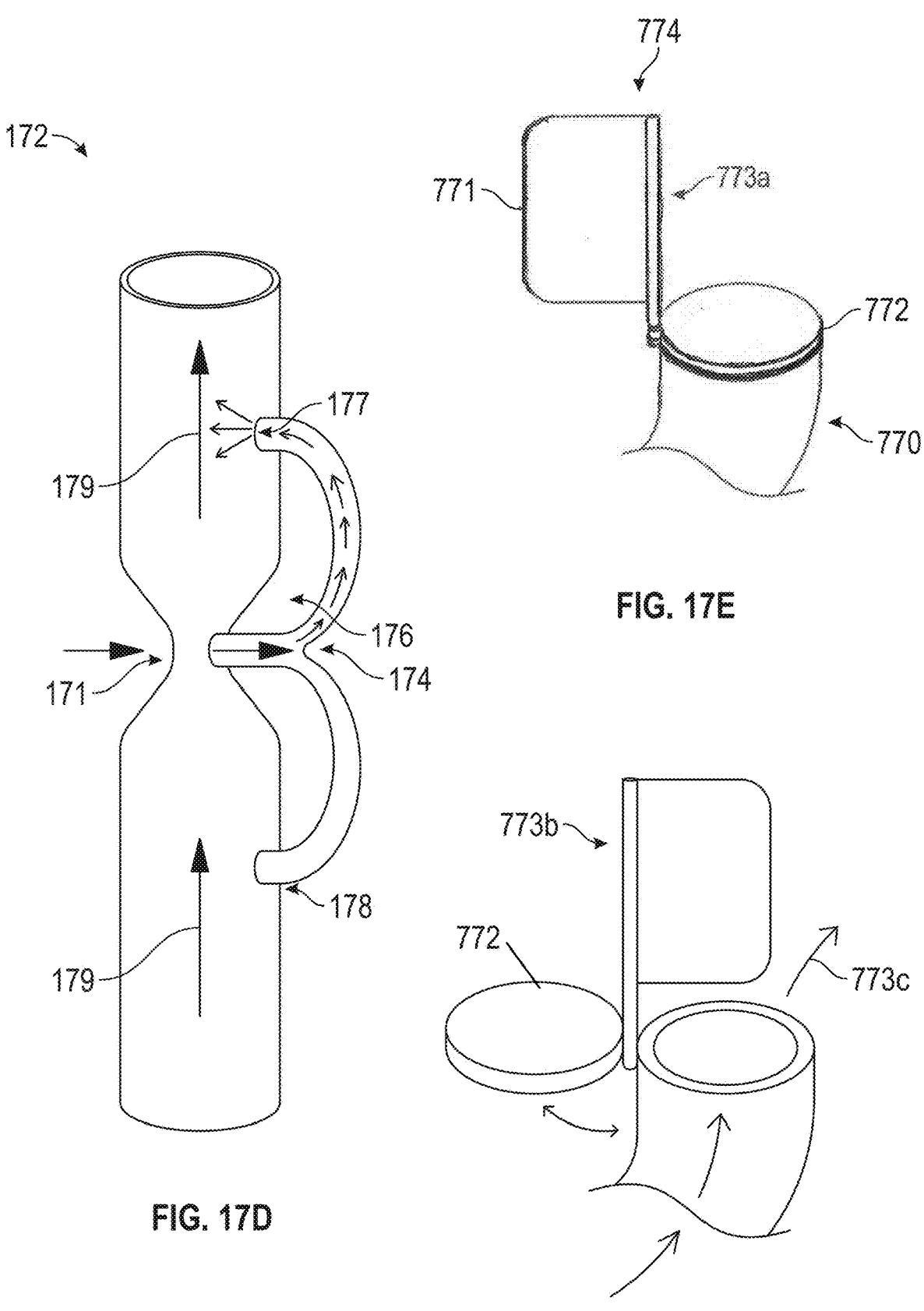

FIG. 17D depicts an example of a pipe 172 having one set of jug handles 174, according to an aspect. The pipes disclosed herein for housing modified wells turbines may also be provided with jug handles having flaps for allowing or restricting air flow through the jug handle-shaped pipes, for example.

As discussed above, the pipe 172 may contain any of the modified wells turbines disclosed herein at the bottleneck midsection 171. One set of jug handles 174 may comprise tubes having a hollow interior for air flow, a permanently open middle entry point 176, an upper entry point 177 and a lower entry point 178. The upper entry point 177 and the lower entry point 178 may be opened or closed via a flap and cover system, shown and discussed in detail when referring to FIGS. 17E-17F. Wind direction is represented by arrows

179. When the air flow is in the indicated direction of arrows 179, the upper entry point 177 opens. The Venturi effect draws air through the upper entry point 177, from the open middle entry point 176. The lower entry point 178 then closes, so that the Venturi effect at the lower entry point 178 does not introduce any turbulence to the rotation of the airfoil blade, and into the airflow moving past the bottleneck and past the airfoil blade. The Venturi suction and associated introduction of turbulence into the pipe are generally always downwind of the modified wells turbine airfoil blade. Additionally, it should be understood that the opening and closing of the entry points are reversed when the wind direction is opposite to that shown by arrows 179.

FIGS. 17E-17F depict detailed enlarged views of the entryway point of the jug handles in a closed state and an opened state, respectively, according to an aspect. As mentioned above, the upper and lower entry points of the jug handles may include a flap and cover system at the ends of the hollow tube 770 of the jug handles. The system may include a sail-like flap 771, and a cover 772. When wind is blowing from direction 773*a*, the flap 771 catches some of the air and rotates about its pole 774. The cover 772 may be attached to the pole such that when the flap 771 rotates, the cover 772 also rotates. The state depicted in FIG. 17E shows that the cover has been rotated such that it is positioned on the hollow tube 770, thus closing the entry point. FIG. 17F depicts the wind direction coming from the direction represented by arrow 773*b*. Here, the flap 771 catches the air and rotates about its pole 774 to turn the cover 772 away from the opening of the hollow tube 770, thus opening the entry point. Air can then flow out of the tube as shown by arrows 773*c*. This system may allow for the Venturi effect to draw air from the side of the modified wells turbine blade at the narrowed neck of the pipe, making them more efficient, and reducing turbulence around the airfoil blade.

To absorb and provide sufficient energy for high volume flow water pumps (potentially on the order of about 140,000 gallons per hour), it may be necessary to use very large floats and piston drive air pumps. The energy captured will be a function of the force applied over a distance. The greater the force, and the greater the distance, the greater the energy captured. The large floats and pistons may use long lever arms to maximize the pressure to which the air may be compressed to in the compressed air storage tanks. The floats driving the lever arms use the buoyancy difference between themselves and the remaining components of the energy capture and storage system as the force generator.

Generally, energy capture to service the demands of high-volume water pumps must be tailored to each location in which the system is used, for best economic fit. Wind, solar, or wave energy are the most likely sources for energy capture and the cost benefit of each must be assessed for any given location. It should be understood that mechanical systems such as the lever arm system described when referring to at least FIGS. 7A-7B, or electricity generating systems such as the modified wells turbine system described when referring to at least FIGS. 5A-5B and 17F, could be selected according to a user's needs or the particularities of the location of the system, for example.

Figure 18:
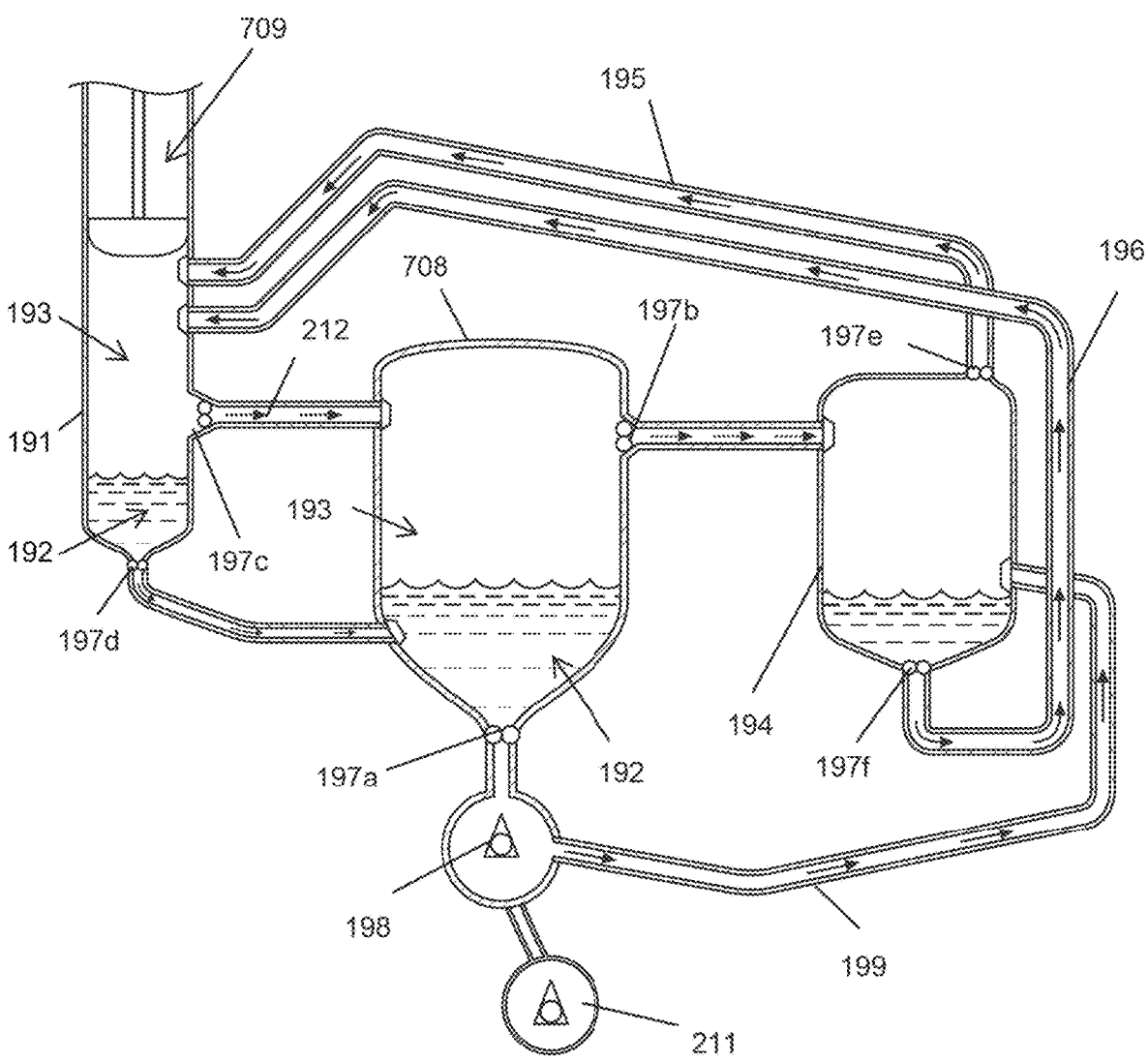
FIG. 18 is a schematic diagram showing the general operation of an energy capture, energy storage, and energy transfer from storage to mechanical work system disclosed herein, according to an aspect.

FIG. 18 is a schematic diagram showing the general operation of an energy capture, energy storage, and energy transfer from storage to mechanical work system disclosed herein, according to an aspect. It should be understood that a single system may comprise one or more of any of the elements shown in FIG. 18, and FIG. 19, discussed in further detail herein. In some embodiments, a piston drive air pump 709 (or plunger pump) is used to transfer the energy captured by the pontoon floats moving up and down in the waves into stored compressed air. Generally, the pump 709 is configured for motion which could be a vertical up-and-down motion or could be in any direction. This motion generally includes a drive phase (which could be a downwards motion) and a recovery phase (which could be an upwards motion). The piston drive air pump cylinder tube 191 may contain both water 192 and air 193. The low pressure resulting from the return stroke of the piston air drive pump 709 draws both air and water from the recovery tank (also referred to as a recapture tank) 194 back through the system into the piston drive air pump cylinder tube 191. Air can travel through the unidirectional air flow tube 195, and liquid can travel through the unidirectional liquid flow tube 196. The central pressure storage tank 708 (also referred to as a storage tank), which effectively acts as a compressed air energy storage 'battery' contains both water (or any other suitable liquid) 192 and air 193.

Generally, the storage tank is configured to contain compressed air, wherein "compressed air" refers to air that is at a higher pressure than the air contained within any other tank of the system depicted in FIG. 18. The compressed air may be isolated to the energy storage tank and may act primarily as a kind of air "spring", absorbing a certain amount of energy and exerting a steady pressure within the system to drive the volume of liquid contained within the energy storage tank through the unidirectional tube 199 past the turbine 198, thus driving the turbine due to the liquid passing the turbine.

The central pressure storage tank 708 may comprise a unidirectional pressure valve 197a for water and another unidirectional pressure valve 197b for air. Another unidirectional pressure valve 197c may be used for regulating the flow of air 193 from the piston drive air pump cylinder 191 to the central tank 708, through a unidirectional air flow tube 212. Another unidirectional pressure valve 197d may be used for regulating the flow of water 192 from the piston drive air pump cylinder 191 to the central tank 708. Another unidirectional pressure valve 197e may be used for regulating the flow of air 193 from the recovery tank 194 to the piston drive air pump cylinder 191. Another unidirectional pressure valve 197f may be used for regulating the flow of water 192 from the recovery tank 194 to the piston drive air pump cylinder 191. The unidirectional pressure valves prevent backflow of air or liquid 'backwards' in the system. They are set to regulate the system and their action plus gravity keep liquid in the base of the chambers. The system also comprises a liquid-driven high efficiency turbine 198 that turns when water flows from the higher-pressure central tank 708 out through the unidirectional liquid flow tube 199 to the low pressure recovery tank. The turbine 198 can be associated with a water pump impeller 211 via a direct drive or geared connection. The impeller 211 is used to pump the nutrient rich deeper ocean waters to the surface in the specialized heat exchanger hose.

Generally, the design depicted in FIG. 18 allows for compressed air energy storage. The release of the compressed air back into mechanical work is done through a liquid interface (e.g., water or oil) with a liquid driven turbine which results in a high efficiency of energy transfer (in approximately the 95% range) versus the typical 45% energy transfer efficiencies associated with wind or air-driven turbines.

Figure 19:
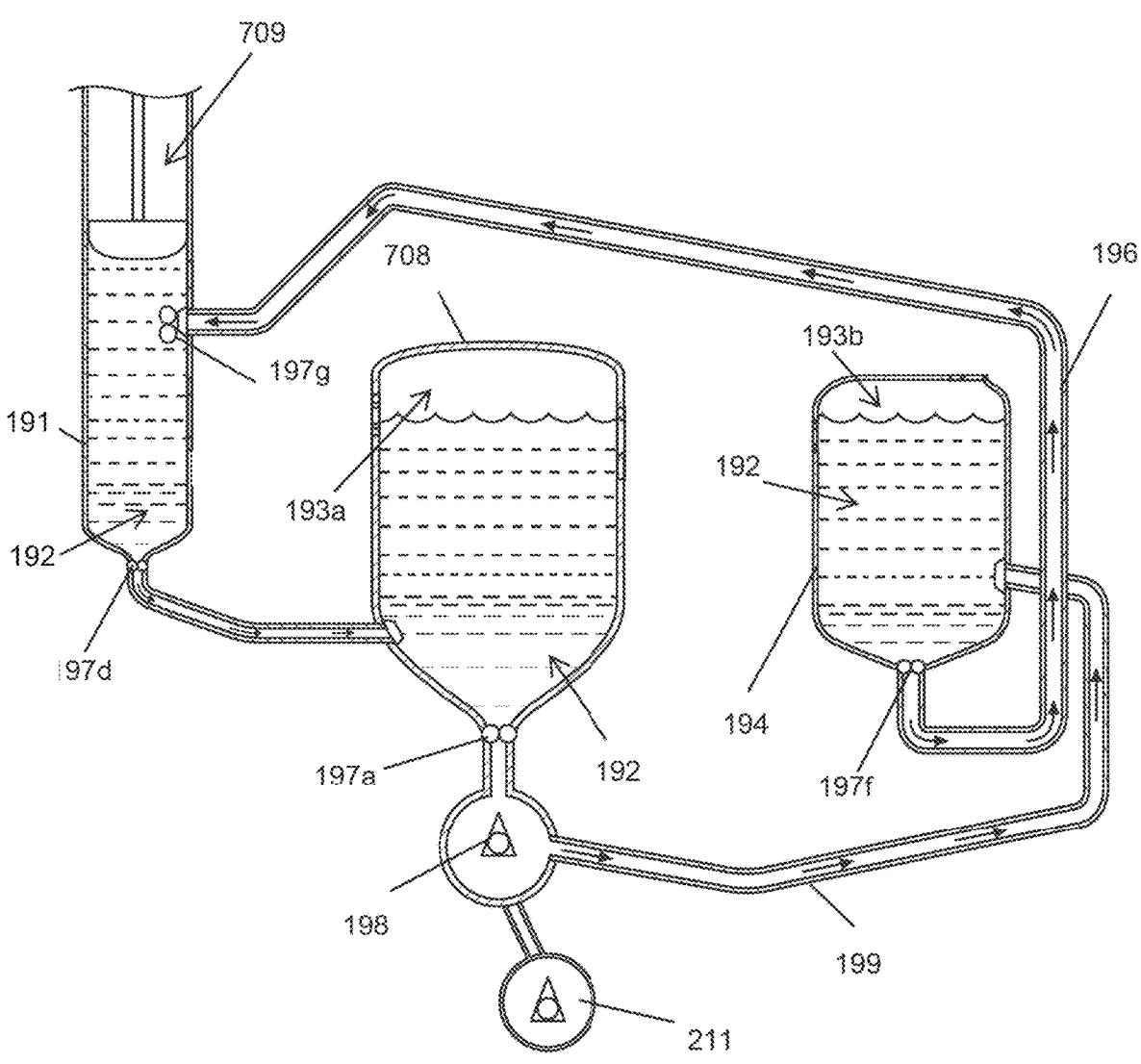
FIG. 19 is a schematic diagram illustrating the general operation of another example of an energy capture and storage system disclosed herein, according to an aspect.

FIG. 19 is a schematic diagram illustrating the general operation of another example of an energy capture and storage system disclosed herein, according to an aspect. In some embodiments, the energy capture and storage systems utilize a design having a piston drive liquid pump with a compressed air cushion in the main storage chamber. The compressed air cushion acts to provide a steady flow of liquid through the liquid interfaced turbine. The air cushion acts in effect as a "spring" being compressed as water is pumped into the chamber and acts to constantly push water out of the chamber past the turbine. Similar to the example shown in FIG. 18, a system may include a piston drive pump chamber tank 799, which is filled with liquid such as water 192, and includes a piston drive pump 709 which can push the water 192. This piston drive pump does not contain air, it is a piston drive liquid pump. The piston drives the liquid through the system. Highly compressed air (that is, air at a high pressure) 193a within the central pressure storage tank 708 acts like a spring, driving a steady flow of liquid through the turbine 198 into a recapture tank 194. The compressed air acts to stabilize the flow of liquid through the system. Low pressure air 193b in the recapture tank 194 does not significantly impede liquid flow past the turbine. It assists the return stroke of the piston drive pump, by sending water 192 from the recapture tank 194 into the piston drive, through a unidirectional flow tube 196. Similar to the system described when referring to FIG. 18, this simplified system also includes unidirectional valves 197d, 197f and 197g regulating the flow of liquid through the system. The chambers containing compressed air are positioned within the system such that gravity keeps the air securely isolated in its location.

Figure 20:
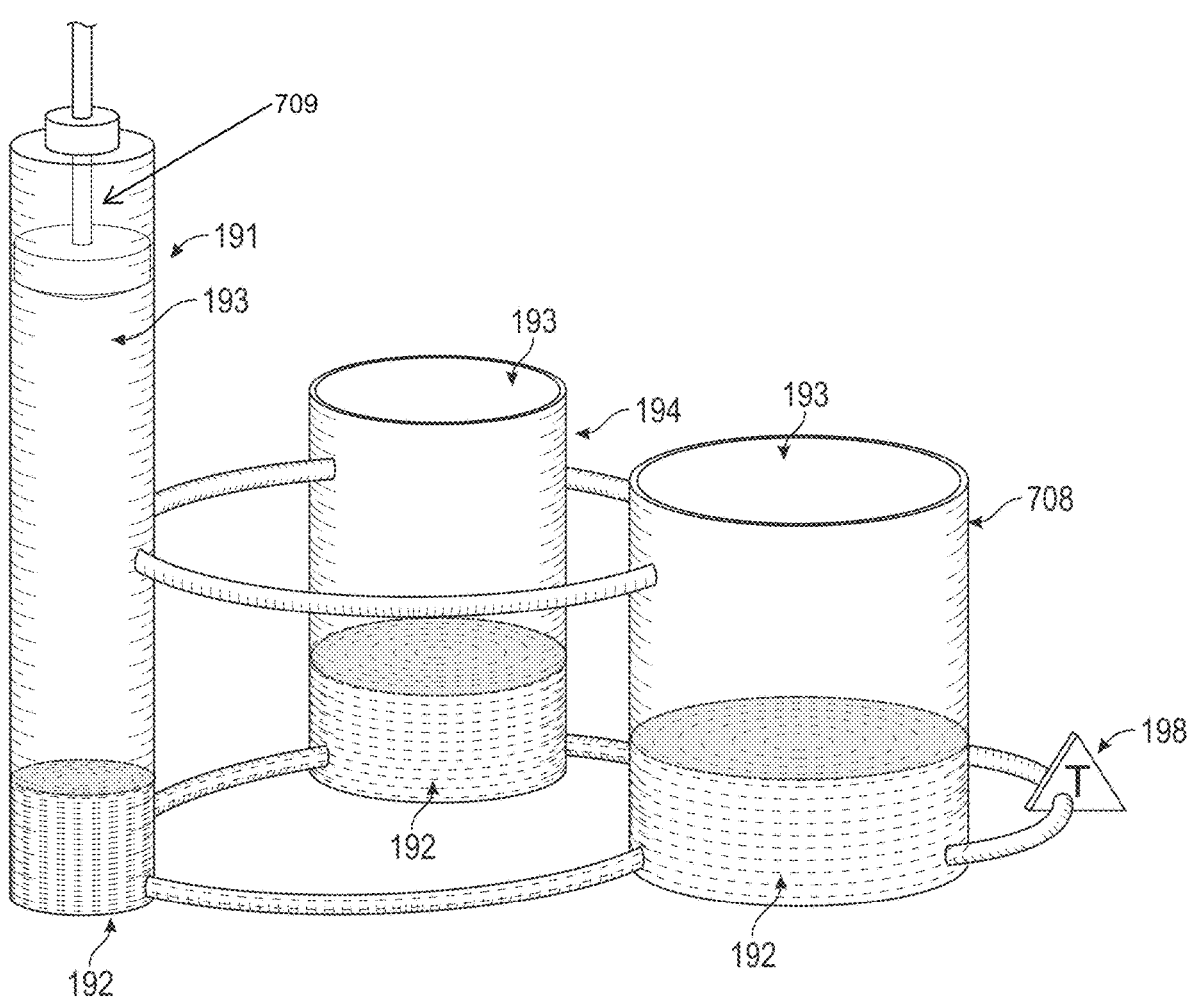
FIG. 20 depicts a perspective view of an exemplary energy capture and storage system disclosed herein, according to an aspect.

FIG. 20 depicts a perspective view of the system of FIG. 18, according to an aspect. Generally, such systems may include piston tube and compressed air storage tanks at set or predetermined elevation levels, such that the liquid interfaces contained within are maintained. Such systems may include a piston drive pump 709. These systems may also include a piston drive air pump cylinder tube 191, a central pressure storage tank 708, and a recovery tank 194, each of which may contain a liquid interface created by containing liquid 192 and air 193. Such systems may also include a liquid-driven turbine 198. As discussed in further detail when referring to FIGS. 18-19, such systems may also include unidirectional tubes for delivering air and liquid between the various containers of the system.

Generally, the systems for energy capture, energy storage, and energy generation disclosed herein may be used for any suitable methods of energy capture, energy storage, and energy generation. In some embodiments, the systems disclosed herein can be used for energy capture, storage, and generation, and the energy generated by the system can be stored within the disclosed energy storage tanks. In some embodiments, the system can be connected to or associated with external devices or external systems configured to use the energy stored within the energy storage tanks of the systems disclosed herein. For example, the modified wells turbine systems disclosed herein acting as electrical energy capture systems may feed into any suitable lead acid or lithium-ion battery energy storage, for powering any other system such as a traditional electric motor high volume water pump, or any other suitable system. It should be understood that the systems disclosed herein could be used in conjunction with, in association with, or connected to suitable systems such as lead acid or lithium-ion batteries, and in turn used with other power or energy systems.

It may be advantageous to set forth definitions of certain words and phrases used in this patent document. The term "couple" and its derivatives refer to any direct or indirect communication between two or more elements, whether or not those elements are in physical contact with one another.

The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention. Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A system for energy capture, energy storage, and stored energy translation to mechanical work, the system comprising:

a piston drive pump cylinder tube for housing a first volume of liquid, a first volume of air, and a piston drive pump located at a first end of the piston drive pump cylinder tube; wherein the piston drive pump is configured for motion comprising a drive phase motion and a recovery phase motion within the piston drive pump cylinder tube when moved by an external force;

an energy storage tank for housing a second volume of liquid and a second volume of air; wherein the second volume of air comprises compressed air configured to store energy captured by the system, and wherein the compressed air comprises a first pressure;

a recovery storage tank for housing a third volume of liquid and a third volume of air, wherein the third volume of air comprises a second pressure, wherein the second pressure is lower than the first pressure;

a turbine connected to and driven by the second volume of liquid of the energy storage tank; wherein the turbine is in communication with the first energy storage tank;

a first unidirectional air tube for connecting the first volume of air from the piston drive pump cylinder tube to the energy storage tank;

a second unidirectional air tube for connecting the second volume of air from the energy storage tank to the recovery storage tank;

a third unidirectional air tube for connecting the third volume of air from the recovery storage tank to the piston drive pump cylinder tube;

a first unidirectional liquid tube for connecting the first volume of liquid from the piston drive pump cylinder tube to the energy storage tank;

a second unidirectional liquid tube for connecting the second volume of liquid from the energy storage tank past the turbine to the recovery tank, such that the turbine is driven by the liquid passing through the second unidirectional liquid tube;

a third unidirectional liquid tube for connecting the third volume of liquid from the recovery tank to the piston drive pump cylinder tube;

wherein the drive phase motion of the piston drive air pump causes a portion of the first volume of air and a portion of the first volume of liquid to move from the piston drive pump cylinder tube to the energy storage tank;

and wherein the recovery phase of motion of the piston drive pump causes a portion of the third volume of liquid and a portion of the third volume of air to move from the recovery tank to the piston drive pump cylinder tube;

an impeller associated with the turbine configured for external pumping work;

and a subsystem for energy generation.

2. The system of claim 1, wherein the system is configured to be used on open water, wherein the external force for moving the piston drive pump is wave motion from the open water; and wherein the external pumping work is pumping of the open water.

3. The system of claim 1, comprising a central housing buoy, wherein the piston drive pump cylinder tube, the energy storage tank, the turbine and the recovery tank are housed within the central housing buoy, and wherein the impeller and a water pump associated with the impellar are external to the central housing buoy.

4. The system of claim 1, wherein the subsystem for energy generation is a mechanical lever arm system comprising:

a pair of lever arms comprising a first lever arm and a second lever arm, each lever arm having a piston end and a pontoon end, wherein the first lever arm is opposite to the second lever arm;

wherein the pontoon end is associated with a pontoon configured to float on open water and capture energy from movement in a vertical plane when driven by wave motion; and wherein the vertical motion causes the piston end to move the piston drive pump.

5. The system of claim 4, comprising a plurality of pairs of lever arms configured in a circular arrangement around the central housing buoy.

6. The system of claim 1, wherein the subsystem for energy generation is an electrical modified wells turbine system comprising:

an airfoil blade having a plurality of fan blades, each fan blade comprising a top fin and a bottom fin and a central groove between the top fin and the bottom fin;

wherein the central groove is configured to decrease air resistance;

wherein the airfoil blade is configured for rotation along a single direction; and wherein the airfoil blade rotates along the single direction when wind blows on the fan from above and rotates along the single direction when the wind blows on the fan from below.

7. The system of claim 6, comprising a pipe for housing the modified wells turbine system, wherein the pipe has a curved top pipe end, a bottom pipe end, and a bottleneck midsection disposed between the curved top pipe end and the bottom pipe end;

wherein the curved top pipe end and the bottom pipe end each have a first width, and the bottleneck midsection has a second width smaller than the first width; and wherein the airfoil blade is disposed within an interior of the pipe at the bottleneck midsection.

8. The system of claim 3, wherein the central housing buoy is constructed from a solar energy absorbing and heat trapping material.

9. The system of claim 1, further comprising a subsystem for causing an upwelling to create a fishery without altering thermoclines in a body of water, comprising:

a pump housed in a floating buoy; and a heat exchanger hose comprising a plurality of protrusions;

wherein the heat exchanger hose and the pump are configured to pump water from a first depth of the body of water to a second depth of the body of water, the second depth being closer to a surface of the body of water than the first depth;

wherein the pumped water is nutrient-rich water; and wherein the plurality of protrusions is configured for transferring heat from surrounding waters to the pumped water within the heat exchanger hose; and wherein the subsystem for causing an upwelling is configured to release the pumped water only when it is warmed to around the ambient water temperature of the second depth of the body of water, such that the pumped water remains at the second depth for a period of time.

10. A system for energy capture, energy storage, and stored energy translation to mechanical work, the system comprising:

a piston drive pump cylinder tube for housing a first volume of liquid, a first volume of air, and a piston drive pump located at a first end of the piston drive pump cylinder tube; wherein the piston drive pump is configured for motion comprising a drive phase motion and a recovery phase motion within the piston drive pump cylinder tube when moved by an external force;

an energy storage tank for housing a second volume of liquid and a second volume of air; wherein the second volume of air comprises compressed air configured to store energy captured by the system, and wherein the compressed air comprises a first pressure;

a recovery storage tank for housing a third volume of liquid and a third volume of air, wherein the third volume of air comprises a second pressure, wherein the second pressure is lower than the first pressure;

a turbine connected to and driven by the second volume of liquid of the energy storage tank; wherein the turbine is in communication with the first energy storage tank;

a first unidirectional liquid tube for connecting the first volume of liquid from the piston drive pump cylinder tube to the energy storage tank;

a second unidirectional liquid tube for connecting the second volume of liquid from the energy storage tank past the turbine to the recovery tank, such that the turbine is driven by the liquid passing through the second unidirectional liquid tube;

a third unidirectional flow liquid tube for connecting the third volume of liquid from the recovery tank to the piston drive pump cylinder tube;

wherein the drive phase motion of the piston drive pump causes a portion of the first volume of liquid to move from the piston drive pump cylinder tube to the energy storage tank;

and wherein the recovery phase motion of the piston drive pump causes a portion of the third volume of liquid to move from the recovery tank to the piston drive air pump cylinder tube;

an impeller associated with the turbine; and a subsystem for energy generation.

11. The system of claim 10, wherein the system is configured to be used on open water, and wherein the external force for moving the piston drive pump is wave motion from the open water.

12. The system of claim 10, comprising a central housing buoy, wherein the piston drive pump cylinder tube, the energy storage tank, and the recovery tank are housed within the central housing buoy, and wherein the turbine and the impeller are external to the central housing buoy.

13. The system of claim 10, wherein the subsystem for energy generation is a mechanical lever arm system comprising:

a pair of lever arms comprising a first lever arm and a second lever arm, each lever arm having a piston end and a pontoon end;

wherein the pontoon end is associated with a pontoon configured to float on open water and move in a vertical motion as a result of wave motion; and

wherein the vertical motion causes the piston end to move the piston drive pump.

14. The system of claim 10, wherein the subsystem for energy generation is an electricity generating modified wells turbine system comprising:

an airfoil blade having a plurality of fan blades, each fan blade comprising a top fin and a bottom fin and a central groove between the top fin and the bottom fin;

wherein the central groove is configured to decrease air resistance;

wherein the airfoil blade is configured for rotation along a single direction; and wherein the airfoil blade rotates along the single direction when wind blows on the fan from above and rotates along the single direction when the wind blows on the fan from below.

15. A method of energy capture, energy storage, and stored energy translation to mechanical work, the method comprising:

providing a system configured for use on open water, the system having:

a piston drive pump cylinder tube for housing a first volume of liquid, and a piston drive pump at a first end of the piston drive air pump cylinder tube; wherein the piston drive pump is configured for motion comprising a drive phase motion and a recovery phase motion within the piston drive pump cylinder tube when moved by wave motion from the open water;

an energy storage tank for storage of a first volume of air and a second volume of liquid wherein the first volume of air comprises compressed air, and wherein the compressed air comprises a first pressure;

a recovery tank for housing a second volume of air and a third volume of liquid;

a turbine connected to the energy storage tank and in communication with the second volume of liquid of the energy storage tank;

a first unidirectional liquid tube for connecting the first volume of liquid from the piston drive pump cylinder tube to the energy storage tank;

a second unidirectional liquid tube for connecting the second volume of liquid from the energy storage tank past the turbine to the recovery tank, such that the turbine is driven by the liquid passing through the second unidirectional liquid tube;

a third unidirectional flow liquid tube for connecting the third volume of liquid from the recovery tank to the piston drive pump cylinder tube;

wherein the drive phase motion of the piston drive pump causes a portion of the first volume of liquid to move from the piston drive pump cylinder tube to the energy storage tank;

and wherein the recovery phase motion of the piston drive pump causes a portion of the third volume of liquid to move from the recovery tank to the piston drive air pump cylinder tube;

an impeller associated with the turbine; and a subsystem for energy generation;

storing energy generated by the system within the energy storage tank; and connecting the system to an external device configured to use the energy stored within the energy storage tank.

16. The method of claim 15, comprising:

providing a subsystem for causing an upwelling to create a fishery without altering thermoclines in a body of water, comprising:

a pump housed in a floating buoy; and a heat exchanger hose comprising a plurality of protrusions;

wherein the heat exchanger hose and the pump are configured to pump water from a first depth of the body of water to a second depth of the body of water, the second depth being closer to a surface of the body of water than the first depth;

wherein the pumped water is nutrient-rich water; and wherein the plurality of protrusions is configured for transferring heat from surrounding waters to the pumped water within the heat exchanger hose; and wherein the subsystem for causing an upwelling is configured to release the pumped water only when it is warmed to around the ambient water temperature of the second depth of the body of water, such that the pumped water remains at the second depth for a period of time.

17. The method of claim 15, comprising operating the subsystem for causing an upwelling, such that the system configured for use on open water is warmed by the pumped water.

18. The method of claim 15, wherein the subsystem for energy generation is a mechanical lever arm system comprising:

a pair of lever arms comprising a first lever arm and a second lever arm, each lever arm having a piston end and a pontoon end;

wherein the pontoon end is associated with a pontoon configured to float on open water and capture energy from movement in a vertical plane when driven by wave motion; and wherein the vertical motion causes the piston end to move the piston drive pump.

19. The method of claim 15, wherein the subsystem for energy generation is an electrical modified wells turbine system comprising:

an airfoil blade having a plurality of fan blades, each fan blade comprising a top fin and a bottom fin and a central groove between the top fin and the bottom fin;

wherein the central groove is configured to decrease air resistance;

wherein the airfoil blade is configured for rotation along a single direction; and wherein the airfoil blade rotates along the single direction when wind blows on the fan from above and rotates along the single direction when the wind blows on the fan from below.

20. The method of claim 19, comprising a pipe for housing the modified wells turbine system, wherein the pipe has a curved top pipe end, a bottom pipe end, and a bottleneck midsection disposed between the curved top pipe end and the bottom pipe end;

wherein the curved top pipe end and the bottom pipe end each have a first width, and the bottleneck midsection has a second width smaller than the first width; and wherein the airfoil blade is disposed within an interior of the pipe at the bottleneck midsection.

* * * * *